US009197768B2

United States Patent
Mishima et al.

(10) Patent No.: US 9,197,768 B2
(45) Date of Patent: Nov. 24, 2015

(54) COOPERATION SYSTEM, MOBILE INFORMATION DEVICE, COOPERATION PROCESSING METHOD, AND NON-TRANSITORY COMPUTER-READABLE RECORDING MEDIUM ENCODED WITH COOPERATION PROCESSING PROGRAM

(71) Applicants: Nobuhiro Mishima, Tokyo (JP);
Manabu Furukawa, Tokyo (JP);
Hideyuki Matsuda, Tokyo (JP);
Kazusei Takahashi, Tokyo (JP);
Mitsuharu Nagai, Tokyo (JP)

(72) Inventors: Nobuhiro Mishima, Tokyo (JP);
Manabu Furukawa, Tokyo (JP);
Hideyuki Matsuda, Tokyo (JP);
Kazusei Takahashi, Tokyo (JP);
Mitsuharu Nagai, Tokyo (JP)

(73) Assignee: KONICA MINOLTA BUSINESS TECHNOLOGIES, INC., Chiyoda-Ku, Tokyo (JP)

(*) Notice: Subject to any disclaimer, the term of this patent is extended or adjusted under 35 U.S.C. 154(b) by 189 days.

(21) Appl. No.: 13/630,790

(22) Filed: Sep. 28, 2012

(65) Prior Publication Data

US 2013/0083209 A1    Apr. 4, 2013

(30) Foreign Application Priority Data

Sep. 30, 2011   (JP) ................................. 2011-217416

(51) Int. Cl.
*H04N 5/225*   (2006.01)
*H04N 1/00*    (2006.01)

(52) U.S. Cl.
CPC ....... *H04N 1/00336* (2013.01); *H04N 1/00347* (2013.01); *H04N 1/00323* (2013.01); *H04N 2201/0084* (2013.01); *H04N 2201/0094* (2013.01)

(58) Field of Classification Search
CPC ................................................. H04N 1/00278
See application file for complete search history.

(56) References Cited

U.S. PATENT DOCUMENTS 7,508,374 B2     3/2009  Tsunoda
2005/0001815 A1*  1/2005  Tsunoda .................... 345/158

(Continued)

FOREIGN PATENT DOCUMENTS

JP   2007-264992 A   10/2007
JP   2008-077655 A   4/2008

OTHER PUBLICATIONS

Japanese Office Action (Notice of Ground of Rejection) dated Nov. 12, 2013, issued by the Japanese Patent Office in corresponding Japanese Patent Application No. 2011-217416, and English language translation of Office Action. (7 pages).

*Primary Examiner* — Lin Ye
*Assistant Examiner* — John H Morehead, III
(74) *Attorney, Agent, or Firm* — Buchanan Ingersoll & Rooney PC

(57) ABSTRACT

A cooperation system includes an image forming apparatus and a mobile information device. The image forming apparatus includes a storage portion which stores source data, and an image forming portion which forms an image of the source data on a sheet of paper. The mobile information device includes an image pickup portion, an image pickup control portion which acquires a picked-up image that the image pickup portion outputs by picking up an image of the image formed on the sheet by the image forming apparatus, a source data acquiring portion which acquires the source data corresponding to the picked-up image from the image forming apparatus, a process target determining portion which determines, on the basis of the picked-up image, a process target part to be processed within the acquired source data, and a process executing portion which executes processing on the determined process target part within the source data.

24 Claims, 21 Drawing Sheets

(56) References Cited

U.S. PATENT DOCUMENTS

| | | | |
|---|---|---|---|
| 2008/0118162 A1* | 5/2008 | Siegemund | 382/229 |
| 2010/0073721 A1* | 3/2010 | Ohk | 358/1.15 |
| 2010/0253789 A1* | 10/2010 | Hayasaki | 348/207.2 |
| 2010/0253790 A1* | 10/2010 | Hayasaki | 348/207.2 |
| 2011/0041078 A1* | 2/2011 | Park et al. | 715/746 |
| 2012/0242846 A1* | 9/2012 | Iwase | 348/207.2 |
| 2012/0278616 A1* | 11/2012 | Stevens | 713/165 |
| 2012/0287460 A1* | 11/2012 | McMillin et al. | 358/1.15 |

* cited by examiner

F I G. 2
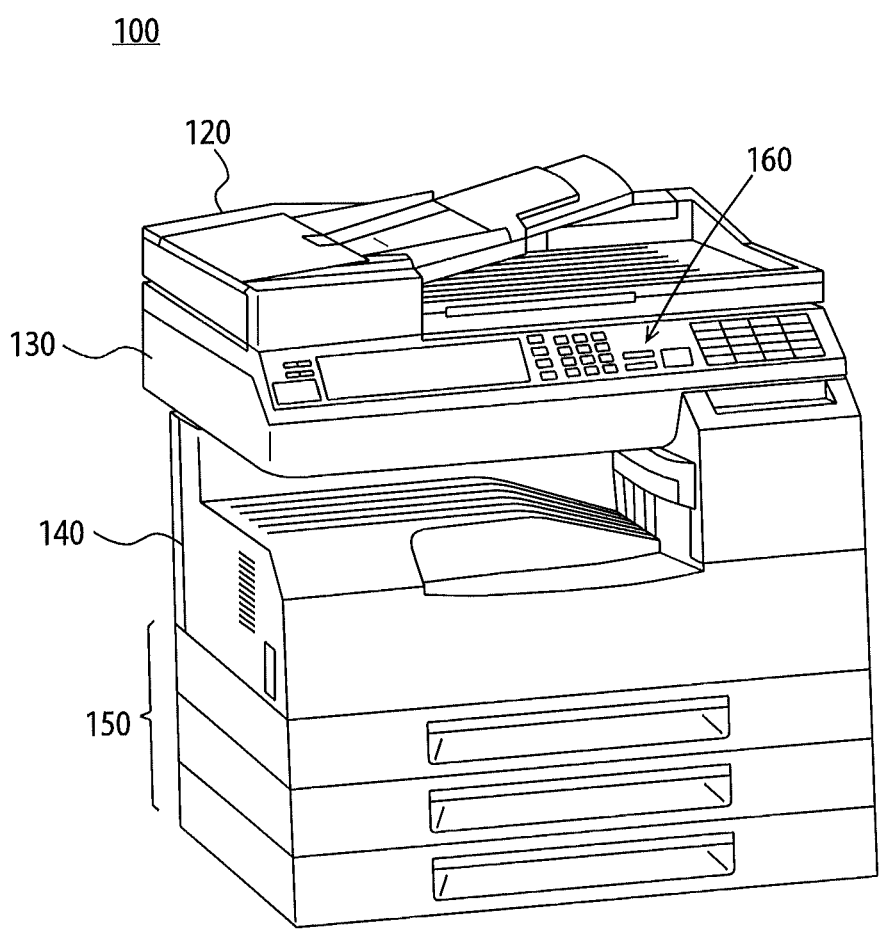

COOPERATION SYSTEM, MOBILE INFORMATION DEVICE, COOPERATION PROCESSING METHOD, AND NON-TRANSITORY COMPUTER-READABLE RECORDING MEDIUM ENCODED WITH COOPERATION PROCESSING PROGRAM

This application is based on Japanese Patent Application No. 2011-217416 filed with Japan Patent Office on Sep. 30, 2011, the entire content of which is hereby incorporated by reference.

BACKGROUND OF THE INVENTION

1. Field of the Invention

The present invention relates to a cooperation system, a mobile information device, a cooperation processing method, and a non-transitory computer-readable recording medium encoded with a cooperation processing program. More particularly, the present invention relates to a cooperation system which includes an image forming apparatus and a mobile information device capable of communicating with the image forming apparatus, a mobile information device included in the cooperation system, a cooperation processing method performed by the mobile information device, and a non-transitory computer-readable recording medium encoded with a cooperation processing program for causing a computer to perform the cooperation processing method.

2. Description of the Related Art

Japanese Patent Laid-Open No. 2008-077655 discloses a mobile electronic device having a display portion arranged at a prescribed position of the device body. The device includes storage means for storing information to be displayed on a display screen of the display portion, moved amount detecting means for detecting the amount of movement of the display portion when the device body is held and moved in a direction perpendicular to the display screen of the display portion, and display control means for displaying the information stored in the storage means on the display screen of the display portion, and dynamically changing the display size of the information in accordance with the amount of movement of the display portion in the perpendicular direction that is detected by the moved amount detecting means. According to this electronic device, a user is able to change the display size of the information being displayed on the display screen with a natural feeling like moving a "magnifying glass". For example, in the case where the conventional electronic device is used to pick up an image of a sheet of paper on which an image has been formed by an image forming apparatus typified by a multi-function peripheral, the image formed on the sheet can be enlarged for display.

There however is a case where an image has been reduced in size by an image forming apparatus before the image is formed on a sheet of paper. In such a case, when an electronic device picks up an image of that image formed on the sheet, even if the device enlarges the picked-up image, the part of the image of the source data that was omitted during the reduction processing by the image forming apparatus cannot be displayed.

SUMMARY OF THE INVENTION

An aspect of the present invention provides a cooperation system including an image forming apparatus and a mobile information device capable of communicating with the image forming apparatus, wherein the image forming apparatus includes: a storage portion to store source data; and an image forming portion to form an image of the stored source data on a sheet of paper, and wherein the mobile information device includes: an image pickup portion; an image pickup control portion to acquire a picked-up image that the image pickup portion outputs by picking up an image of the image formed on the sheet by the image forming apparatus; a source data acquiring portion to acquire the source data corresponding to the picked-up image from the image forming apparatus; a process target determining portion to determine, on the basis of the picked-up image, a process target part to be processed within the acquired source data; and a process executing portion to execute processing on the determined process target part within the source data.

Another aspect of the present invention provides a mobile information device capable of communicating with an image forming apparatus, the image forming apparatus forming an image of source data on a sheet of paper and storing the source data, wherein the mobile information device includes: an image pickup portion; an image pickup control portion to acquire a picked-up image that the image pickup portion outputs by picking up an image of the image formed on the sheet by the image forming apparatus; a source data acquiring portion to acquire the source data corresponding to the picked-up image from the image forming apparatus; a process target determining portion to determine, on the basis of the picked-up image, a process target part to be processed within the acquired source data; and a process executing portion to execute processing on the determined process target part within the source data.

A further aspect of the present invention provides a cooperation processing method performed in a mobile information device capable of communicating with an image forming apparatus, the image forming apparatus forming an image of source data on a sheet of paper and storing the source data, wherein the method includes the steps of: acquiring a picked-up image that an image pickup portion outputs by picking up an image of the image formed on the sheet by the image forming apparatus; acquiring the source data corresponding to the picked-up image from the image forming apparatus; determining, on the basis of the picked-up image, a process target part to be processed within the acquired source data; and executing processing on the determined process target part within the source data.

Yet another aspect of the present invention provides a non-transitory computer-readable recording medium encoded with a cooperation processing program performed by a computer that controls a mobile information device capable of communicating with an image forming apparatus, the image forming apparatus forming an image of source data on a sheet of paper and storing the source data, wherein the program causes the computer to perform the steps of: acquiring a picked-up image that an image pickup portion outputs by picking up an image of the image formed on the sheet by the image forming apparatus; acquiring the source data corresponding to the picked-up image from the image forming apparatus; determining, on the basis of the picked-up image, a process target part to be processed within the acquired source data; and executing processing on the determined process target part within the source data.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 2 is a perspective view of an MFP;

DESCRIPTION OF THE PREFERRED EMBODIMENTS

Figure 1:
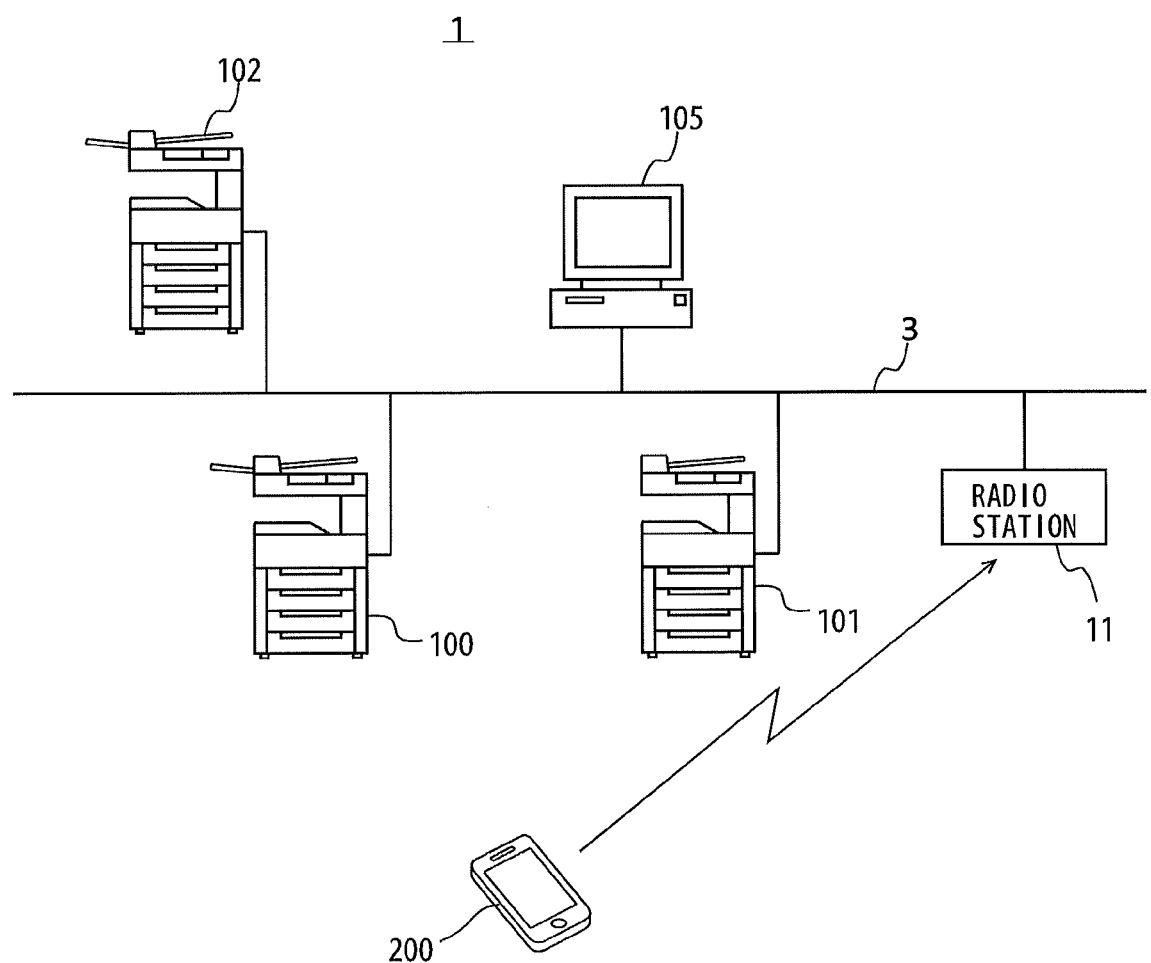
FIG. 1 schematically shows an image processing system according to an embodiment of the present invention.

The preferred embodiments of the present invention will be described below in conjunction with the drawings. In the following description, the same or corresponding parts are denoted by the same reference characters.

Their names and functions are also the same. Thus, a detailed description thereof will not be repeated.

<First Embodiment>

FIG. 1 schematically shows an image processing system according to an embodiment of the present invention. Referring to FIG. 1, an image processing system 1 includes multi-function peripherals (hereinafter, referred to as "MFPs") 100, 101, and 102 as image forming apparatuses, a personal computer (hereinafter, referred to as a "PC") 105, a mobile information device 200, and a radio station 11, which are each connected to a network 3.

While three MFPs 100, 101, and 102 are connected to network 3 in FIG. 1, the number of MFPs is not limited thereto; at least one MFP may be connected to network 3. The image forming apparatus is not limited to MFP 100, 101, or 102, and may be, e.g., a facsimile machine, printer, or other device that has the image forming function.

Network 3 is a local area network (LAN), which may be connected in a wired or wireless manner. Network 3 is not necessarily the LAN; it may be a network that uses public switched telephone networks (PSTN) or the like. Network 3 is connected to a wide area network (WAN) such as the Internet. Therefore, MFPs 100, 101, and 102 can communicate with each other via network 3.

Mobile information device 200 is a typical personal digital assistant (PDA) such as a smartphone. Mobile information device 200 communicates with a cellular base station in a wireless manner so as to be connected to a mobile telephone network for conversation. Mobile information device 200 also has a wireless LAN function.

Radio station 11 is also connected to network 3. Radio station 11 is a relay unit for network 3. Radio station 11 communicates with mobile information device 200 including the wireless LAN communication function, to thereby connect mobile information device 200 to network 3. This enables mobile information device 200 to transmit data to and receive data from MFPs 100, 101, 102, and PC 105 which are connected to network 3.

PC 105 is a typical computer. PC 105 is used by a user to execute application programs for carrying out various processes, which include: a process of storing data in one of MFPs 100, 101, and 102; and a process of causing MFP 100, 101, or 102 to print an image of data. The data may include a Web page downloaded from a server connected to the Internet, data of a map or the like, and data generated by executing an application program.

MFPs 100, 101, and 102 may all have the same hardware configuration, or may each have a different hardware configuration. MFPs 100, 101, and 102 each have at least an image forming function of forming, on the basis of data, an image of the data on a sheet of paper or the like. While MFPs 100, 101, and 102 may have different hardware configurations, it is here assumed that MFP 100 has any configurations included in at least one of the other MFPs 101 and 102.

Figure 3:
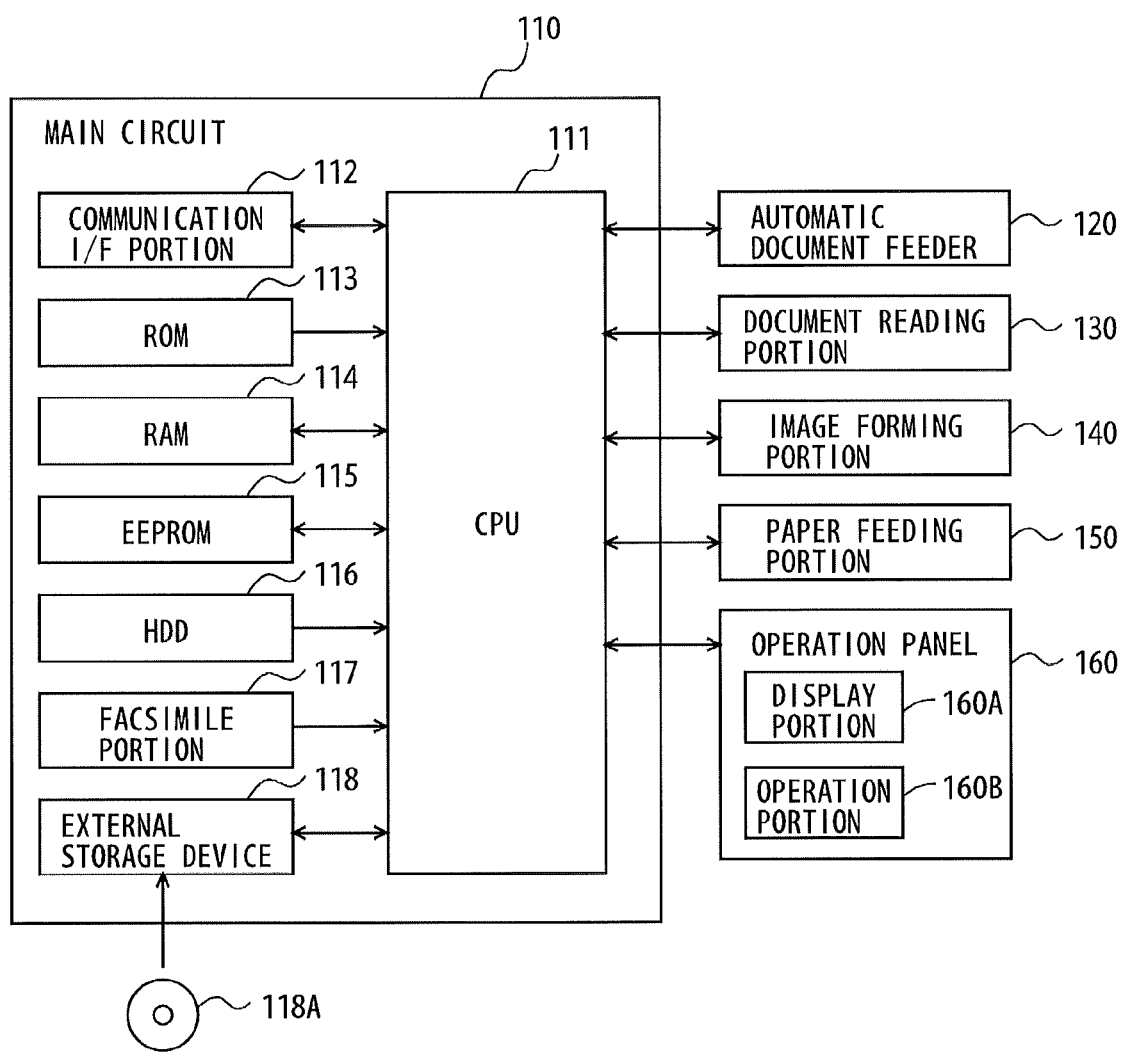
FIG. 3 is a block diagram schematically showing the hardware configuration of the MFP.

FIG. 2 is a perspective view of the MFP. FIG. 3 is a block diagram schematically showing the hardware configuration of the MFP. Referring to FIGS. 2 and 3, MFP 100 includes: a main circuit 110; a document reading portion 130 which reads a document; an automatic document feeder 120 which feeds a document to document reading portion 130; an image forming portion 140 which forms an image on a sheet of paper or the like on the basis of image data output from document reading portion 130 that has read a document; a paper feeding portion 150 which supplies sheets of paper to image forming portion 140; and an operation panel 160 serving as a user interface.

Main circuit 110 includes a central processing unit (CPU) 111, a communication interface (I/F) portion 112, a read only memory (ROM) 113, a random access memory (RAM) 114, an electrically erasable and programmable ROM (EEPROM) 115, a hard disk drive (HDD) 116 as a mass storage, a facsimile portion 117, and an external storage device 118 on which a compact disc ROM (CD-ROM) 118A is mounted. CPU 111 is connected with automatic document feeder 120, document reading portion 130, image forming portion 140, paper feeding portion 150, and operation panel 160, and is responsible for overall control of MFP 100.

ROM 113 stores a program executed by CPU 111 or data necessary for execution of the program. RAM 114 is used as a work area when CPU 111 executes a program. Further, RAM 114 temporarily stores read data (image data) continuously transmitted from document reading portion 130.

Operation panel 160, which is provided on an upper surface of MFP 100, includes a display portion 160A and an operation portion 160B. Display portion 160A is a display such as a liquid crystal display (LCD) or an organic electroluminescence display (ELD), and displays an instruction menu for the user, information about acquired image data, and others. Operation portion 160B, which is provided with a plurality of keys, accepts input data such as instructions, characters, and numerical characters, according to the key operations by the user. Operation portion 160B further includes a touch panel provided on display portion 160A.

Communication I/F portion 112 is an interface for connecting MFP 100 to network 3. CPU 111 communicates with MFP 101, 102, PC 105, or mobile information device 200 via communication I/F portion 112 for data transmission/reception. Further, communication I/F portion 112 is able to communicate with a computer connected to the Internet via network 3.

Facsimile portion 117 is connected to public switched telephone networks (PSTN), and transmits facsimile data to or receives facsimile data from the PSTN. Facsimile portion 117 converts the image data which has been read by document reading portion 130 or the data which has been stored in HDD 116, to facsimile data, and transmits the facsimile data to a facsimile machine connected to the PSTN. Further, facsimile portion 117 stores the received facsimile data into HDD 116, or causes image forming portion 140 to form an image of the facsimile data on a sheet of paper.

External storage device 118 is mounted with CD-ROM 118A that stores a program. CPU 111 loads the program stored in CD-ROM 118A, via external storage device 118, into RAM 114 for execution. It is noted that the recording medium for storing a program is not restricted to CD-ROM 118A. It may be a flexible disc, a cassette tape, an optical disc (magneto-optical (MO) disc, mini disc (MD), digital versatile disc (DVD)), an IC card, an optical card, or a semiconductor memory such as a mask ROM, an erasable programmable ROM (EPROM), an electrically erasable and programmable ROM (EEPROM), or the like. Further, a program stored in HDD 116 may be loaded into RAM 114 for execution. In this case, MFP 100 may download a program from another computer connected to network 3, and store the program in HDD 116. As used herein, the "program" includes, not only the program which CPU 111 can execute directly, but also a source program, a compressed program, an encrypted program, and others.

Figure 4:
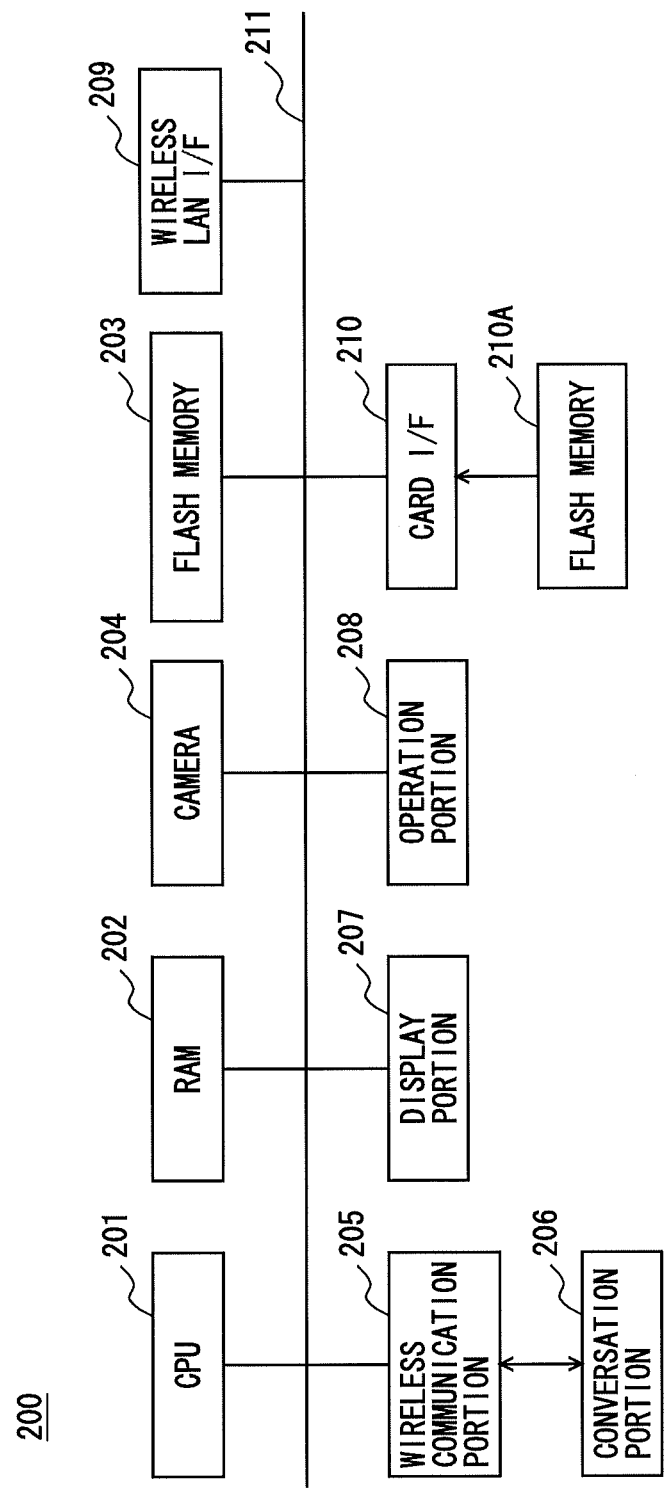
FIG. 4 is a functional block diagram schematically showing the hardware configuration of a mobile information device according to a first embodiment of the present invention.

FIG. 4 is a functional block diagram schematically showing the hardware configuration of a mobile information device according to a first embodiment of the present invention. Referring to FIG. 4, mobile information device 200 includes: a CPU 201 which is responsible for overall control of mobile information device 200; a RAM 202 used as a work area for CPU 201; a flash memory 203 which stores data in a non-volatile manner; a camera 204; a wireless communication portion 205 connected to a conversation portion 206; a display portion 207 displaying information; an operation portion 208 which accepts inputs by a user; a wireless LAN interface (I/F) 209; and a card I/F 210.

Wireless communication portion 205 communicates in a wireless manner with a cellular base station connected to a telephone communication network. Wireless communication portion 205 connects mobile information device 200 to the telephone communication network to allow a conversation using conversation portion 206. Wireless communication portion 205 decodes sound signals obtained by demodulating wireless signals which are received from the cellular base station, for output to conversation portion 206. Wireless communication portion 205 codes sound input from conversation portion 206, and transmits it to the cellular base station. Conversation portion 206 has a microphone and a speaker, and outputs the sound input from wireless communication portion 205 from the speaker, and outputs the sound input from the microphone to wireless communication portion 205. Furthermore, wireless communication portion 205 is controlled by CPU 201, and connects mobile information device 200 to an e-mail server for transmission/reception of e-mail.

Camera 204 is provided with a lens and a photoelectric conversion element such as a complementary metal oxide semiconductor (CMOS) sensor. The lens collects light and focuses it onto the CMOS sensor, which in turn performs photoelectric conversion of the received light to output image data to CPU 201.

Display portion 207 is a display such as a liquid crystal display (LCD) or an organic ELD, and displays an instruction menu for the user, information about acquired image data, and others. Operation portion 208, which is provided with a plurality of keys, accepts input data such as instructions, characters, and numerical characters, according to the key operations by the user.

Display portion 207 is disposed on a side opposite from the side on which camera 204 is arranged. Display portion 207 has a display surface having its normal line corresponding to the optical axis of the lens of camera 204. This makes the subject of camera 204 and the display surface both face the user, thereby allowing the user to see both the subject, which is the image formed on a sheet, and the image displayed on the display surface. For example, in the case where a picked-up image that was picked up by camera 204 is displayed as it is on display portion 207, the user is able to use mobile information device 200 like a magnifying glass.

Wireless LAN I/F 209 is an interface that communicates with radio station 11 to connect mobile information device 200 to network 3. Internet protocol (IP) addresses of MFPs 100, 101, and 102 may be registered in advance in mobile information device 200, so that mobile information device 200 can communicate with MFPs 100, 101, and 102 for transmission/reception of data.

Card I/F 210 is mounted with a flash memory 210A. CPU 201 is capable of accessing flash memory 210A via card I/F 210. CPU 201 loads a program, which is recorded on flash memory 210A mounted to card I/F 210, into RAM 202 for execution. It is noted that the program executed by CPU 201 is not restricted to the program recorded on flash memory 210A. CPU 201 may load a program stored in flash memory 203, into RAM 202 for execution.

In this case, mobile information device 200 may download a program from another computer connected to network 3, and store the program into flash memory 203. As used herein, the "program" includes, not only the program which CPU 201 can execute directly, but also a source program, a compressed program, an encrypted program, and others.

In image processing system 1 according to the present embodiment, data is transmitted and received between MFPs 100, 101, 102, and mobile information device 200. The protocol for transmitting and receiving data is not particularly limited; for example, HTTP (HyperText Transfer Protocol), FTP (File Transfer Protocol), and SMTP (Simple Mail Transfer Protocol), POP (Post Office Protocol) etc. may be used. While mobile information device 200 can transmit data to and receive data from any of MFPs 100, 101, and 102, for the sake of explanation, the case of transmitting and receiving data to and from MFP 100 will be described below.

Figure 5:
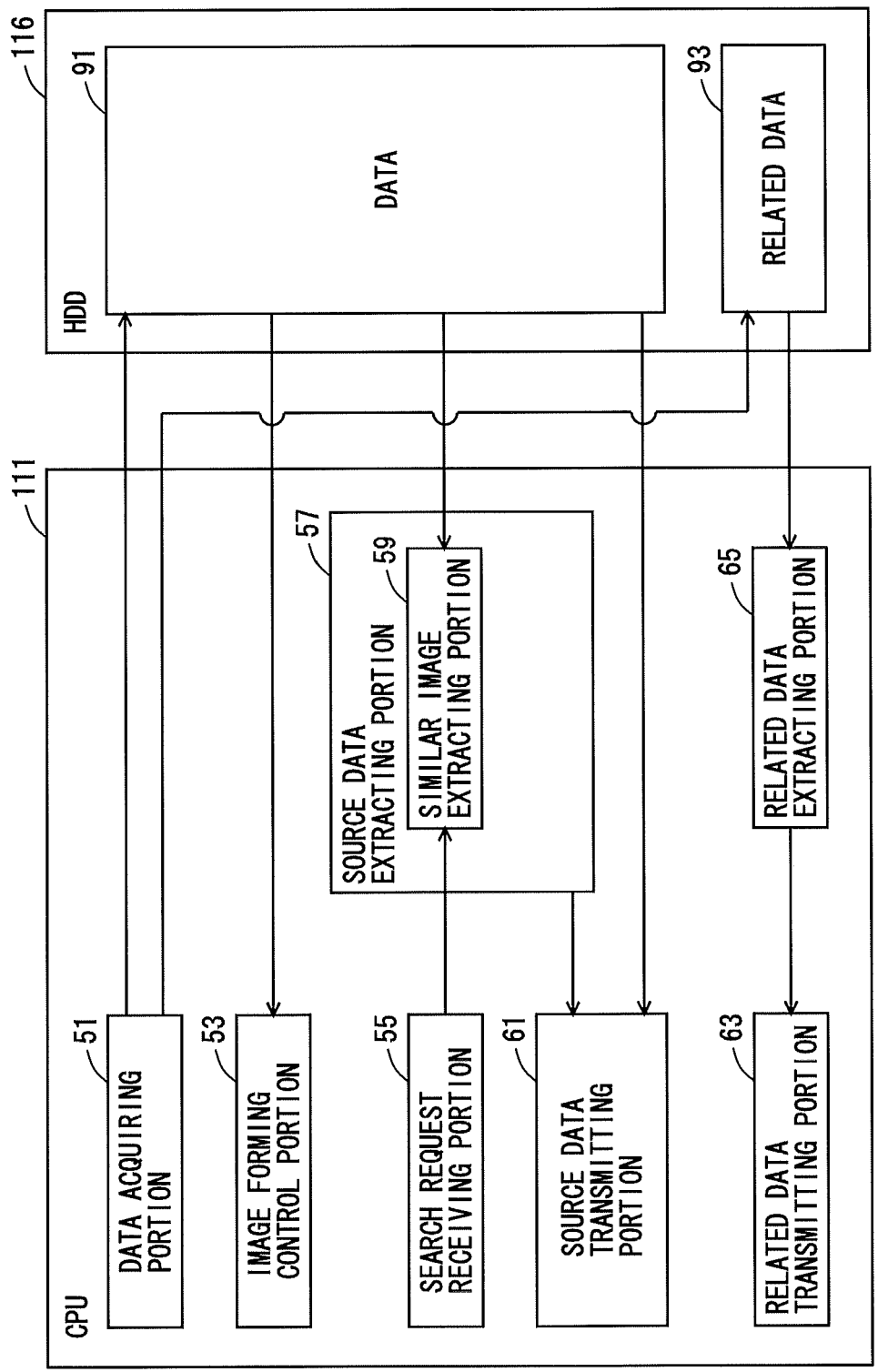
FIG. 5 is a block diagram showing, by way of example, the functions of a CPU included in the MFP according to the first embodiment.

FIG. 5 is a block diagram showing, by way of example, the functions of a CPU included in the MFP according to the first embodiment. The functions of CPU 111 included in MFP 100 shown in FIG. 5 are formed in CPU 111 as CPU 111 executes an MFP-side cooperation program stored in ROM 113, HDD 116, EEPROM 115, or CD-ROM 118A. The MFP-side cooperation program is part of a cooperation processing program.

Referring to FIG. 5, CPU 111 included in MFP 100 includes: a data acquiring portion 51 which acquires data; an image forming control portion 53 which forms an image of data; a search request receiving portion 55; a source data extracting portion 57; a source data transmitting portion 61; a related data transmitting portion 63; and a related data extracting portion 65.

Data acquiring portion 51 controls communication I/F portion 112 to receive data from the outside. On receipt of data, data acquiring portion 51 stores the received data in HDD 116. As a result, data 91 is stored in HDD 116. Further, data acquiring portion 51 acquires image data that document reading portion 130 outputs by reading a document, and stores the acquired image data in HDD 116.

The data that data acquiring portion 51 receives from the outside includes data transmitted from PC 105. The data transmitted from the PC includes application data and print data. The application data refers to data which is generated as PC 105 executes an application program. The application data includes, for example, text data which is generated when a text editing program is executed, spreadsheet data which is generated when a spreadsheet program is executed, and image data which is generated when an image editing program is executed. The data that data acquiring portion 51 receives from the outside also includes a Web page written in a markup language which is downloaded from a server connected to the Internet.

In the case where data acquiring portion 51 receives data as well as related data that is related to that data, data acquiring portion 51 stores the received related data in HDD 116 in association with that data. As a result, related data 93 is stored in HDD 116. The related data includes information related to data 91, and information as a supplement to data 91. As an example of the information related to data 91, in the case where data 91 is an information material for a product, the information related to data 91 is an information material for a similar product. As an example of the information as a supplement to data 91, in the case where data 91 is image data showing a map, the information as a supplement to data 91 is information about shops located in that map. Further, in the case where data 91 is a conference material, the information as a supplement to data 91 is a document explaining the conference material. The data format of the related data is not particularly restricted; it may be text or image.

Image forming control portion 53 controls image forming portion 140 to form an image of data stored in HDD 116 on a sheet of paper. In the case where data acquiring portion 51 receives print data from PC 105, image forming control portion 53 causes image forming portion 140 to form an image of the received print data. Further, when a user operates operation portion 160B to designate at least one of a plurality of pieces of data 91 stored in HDD 116, image forming control portion 53 causes image forming portion 140 to form an image of the designated piece of data 91. In other words, image forming control portion 53 causes image forming portion 140 to form an image of the data designated by the user of PC 105 or the user of MFP 100.

Search request receiving portion 55 controls communication I/F portion 112 to receive a search request transmitted from mobile information device 200, which will be described later. The search request includes a picked-up image that was picked up by mobile information device 200. Search request receiving portion 55 outputs the picked-up image included in the received search request, to source data extracting portion 57. Search request receiving portion 55 also outputs device identification information of the device that has issued the search request, i.e. mobile information device 200 in this example, to source data transmitting portion 61.

Source data extracting portion 57 includes a similar image extracting portion 59. Similar image extracting portion 59 compares the picked-up image received from search request receiving portion 55 with the images of data 91 stored in HDD 116, and extracts, from data 91, any piece of data 91 the image of which includes an area identical to or similar to the picked-up image. For determining whether two images are similar or not, a well-known image recognition technique may be used. For example, the images may be subjected to differential processing, and the similarity may be determined according to whether the edge shapes in the differential images are identical or similar. When similar image extracting portion 59 extracts data 91 of the image that includes an area identical to or similar to the picked-up image, similar image extracting portion 59 outputs the extracted data 91 to source data transmitting portion 61.

Source data transmitting portion 61 transmits the data 91 received from source data extracting portion 57, via communication I/F portion 112, to mobile information device 200 that is specified by the device identification information received from search request receiving portion 55.

Related data transmitting portion 63 controls communication I/F portion 112 to receive a related data transmission request transmitted from mobile information device 200, which will be described later. The related data transmission request includes data identification information for identifying one of the pieces of data 91 stored in HDD 116. On receipt of the related data transmission request, related data transmitting portion 63 outputs the data identification information included in the received related data transmission request to related data extracting portion 65.

When related data extracting portion 65 receives the data identification information from related data transmitting portion 63, related data extracting portion 65 extracts, from the pieces of related data 93 stored in HDD 116, any piece of related data 93 that is associated with the piece of data 91 specified by the data identification information received from related data transmitting portion 63. Then, related data extracting portion 65 outputs the extracted piece of related data 93 to related data transmitting portion 63. Related data transmitting portion 63 transmits the piece of related data 93 received from related data extracting portion 65, via communication I/F portion 112, to mobile information device 200 that has issued the related data transmission request.

Figure 6:
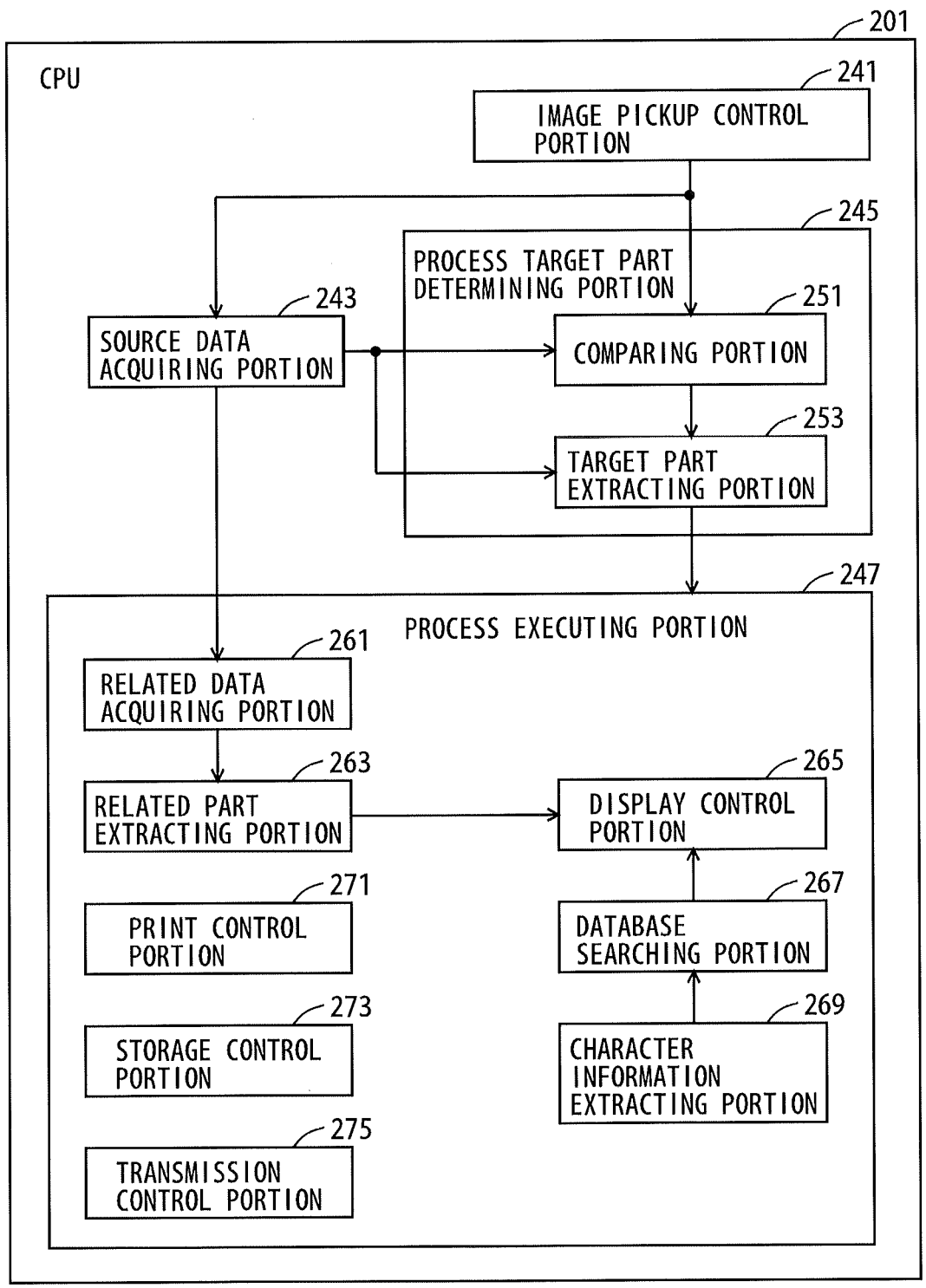
FIG. 6 is a block diagram showing, by way of example, the functions of a CPU included in the mobile information device according to the first embodiment.

FIG. 6 is a block diagram showing, by way of example, the functions of a CPU included in the mobile information device according to the first embodiment. The functions of CPU 201 included in mobile information device 200 shown in FIG. 6 are formed in CPU 201 as CPU 201 executes an image pickup cooperation program stored in flash memory 203 or 210A. The image pickup cooperation program is part of the cooperation processing program.

Referring to FIG. 6, CPU 201 included in mobile information device 200 includes: an image pickup control portion 241 which controls camera 204; a source data acquiring portion 243 which acquires source data; a process target part determining portion 245 which determines a process target range within the source data; and a process executing portion 247 which executes processing on a process target part within the source data that is specified by the process target range.

Image pickup control portion 241 controls camera 204 and, in response to an input by a user of an image pickup instruction to operation portion 208, causes camera 204 to pick up an image of a subject. Image pickup control portion 241 acquires a picked-up image that camera 204 outputs by picking up an image of the subject. Image pickup control portion 241 outputs the picked-up image output from camera 204, to source data acquiring portion 243 and process target part determining portion 245. Here, the subject the image of which is to be picked up by camera 204 is a sheet of paper on which an image has been formed by MFP 100.

Source data acquiring portion 243 transmits a search request including the picked-up image received from image pickup control portion 241, via wireless LAN I/F 209, to MFP 100. As previously described, on receipt of the search request, MFP 100 returns the source data of the image having at least a part identical to or similar to the picked-up image. When wireless LAN I/F 209 receives the source data 91 from MFP 100, source data acquiring portion 243 acquires the received source data 91. Source data acquiring portion 243 outputs the acquired source data 91 to process target part determining portion 245, and also outputs the data identification information of the source data 91 to process executing portion 247.

Process target part determining portion 245 includes a comparing portion 251 and a target part extracting portion 253. Comparing portion 251 receives a picked-up image from image pickup control portion 241 and source data from source data acquiring portion 243. Comparing portion 251 compares the picked-up image with the image of the source data. Specifically, comparing portion 251 compares the picked-up image with an area of at least a part of the image of the source data, and extracts, from within the image of the source data, an area identical to or similar to the picked-up image. For extracting an area identical to or similar to the picked-up image from within the image of the source data, a well-known image recognition technique may be used. Comparing portion 251 outputs positional information indicating a position within the image of the source data that corresponds to the area extracted from the image of the source data, to target part extracting portion 253.

Target part extracting portion 253 receives source data from source data acquiring portion 243 and positional information from comparing portion 251. Target part extracting portion 253 extracts, from the source data, a part of the source data corresponding to the position indicated by the positional information, as a process target part, and outputs the extracted process target part to process executing portion 247.

Process executing portion 247 executes predetermined processing on the process target part input from process target part determining portion 245. Process executing portion 247 includes: a related data acquiring portion 261, a related part extracting portion 263, a display control portion 265, a database searching portion 267, a character information extracting portion 269, a print control portion 271, a storage control portion 273, and a transmission control portion 275.

When display control portion 265 receives a process target part from process target part determining portion 245, display control portion 265 displays an image of the process target part on display portion 207. The process target part is at least a part of data 91 that corresponds to an area within the image of data 91 that has been determined to be identical to or similar to the picked-up image taken by and output from camera 204. This means that an original image of data 91, rather than the picked-up image, can be displayed, which contains a greater amount of information than the picked-up image. More specifically, here, a picked-up image is obtained by picking up an image of the image of data 91 formed on a sheet of paper by MFP 100. There may be a case where MFP 100 performs reduction processing on data 91 before forming an image thereof, in which case the picked-up image may have an omitted part. On the other hand, in the process target part in data 91 corresponding to the picked-up image, the part omitted by MFP 100 is left intact. Accordingly, it is possible to display an image having a greater amount of information, for example an image of higher resolution, than the picked-up image. Particularly in the case where camera 204 picks up an image of a part of the image formed on a sheet of paper, the image is displayed by enlarging the image formed on the sheet. In this case, even when the image is enlarged in size, the part omitted by MFP 100 cannot be reproduced. For example in the case where a character was omitted by MFP 100, the picked-up image includes no character; the omitted character cannot be displayed. In contrast, the character is included in the process target part in data 91, so that the character can be displayed.

Related data acquiring portion 261 receives data identification information of source data 91 from source data acquiring portion 243 and, in response to an input by a user of a related data acquiring instruction to operation portion 208, transmits a related data transmission request including the data identification information of source data 91, via wireless LAN I/F 209, to MFP 100. As previously described, when MFP 100 receives the related data transmission request, it returns related data 93. When wireless LAN I/F 209 receives related data 93 from MFP 100, related data acquiring portion 261 acquires the received related data 93. Related data acquiring portion 261 outputs the acquired related data to related part extracting portion 263.

When related part extracting portion 263 receives related data from related data acquiring portion 261, related part extracting portion 263 extracts a part of the received related data that corresponds to the process target part received from target part extracting portion 253, as a related part. Related part extracting portion 263 outputs the extracted related part to display control portion 265. On receipt of the related part from related part extracting portion 263, display control portion 265 displays the related part so as to be overlaid on the process target part being displayed on display portion 207. The related data includes information related to data 91 or information as a supplement to data 91. Related part extracting portion 263 extracts, as the related part, a part of related data 93 that includes information related to the process target part of data 91, or a part of related data 93 that includes information supplementing the process target part. In the case where a plurality of parts of data 91 are associated with a plurality of parts of related data 93 in advance, related part extracting portion 263 extracts, as the related part, one of the plurality of parts of related data 93 that is associated with the process target part. Still alternatively, related part extracting portion 263 may extract, as the related part, a part of related data 93 that includes the same character as the one included in the process target part, or a part of related data 93 that is within a prescribed range from that character.

Character information extracting portion 269 receives a process target part from target part extracting portion 253 and, in response to an input by a user of a search request to operation portion 208, extracts character information from the process target part and outputs the extracted character information to database searching portion 267. In the case where the process target part includes a plurality of pieces of character information, character information extracting portion 269 preferably extracts the piece of character information that is arranged closest to the center of the process target part. The character information may be a character string, for example. In the case where data 91 is an image, character information extracting portion 269 carries out character recognition processing to extract character information. In the case where database searching portion 267, which will be described later, is capable of performing a search using an image as a key, the character information may be an image.

When database searching portion 267 receives character information from character information extracting portion 269, database searching portion 267 displays a database search setup screen on display portion 207. Upon acceptance of a database search instruction from a user, database searching portion 267 transmits a database search request including the character information as a search key to a predetermined search engine via wireless LAN I/F 209. The search engine may be a search site connected to the Internet, for example. When wireless LAN I/F 209 receives a search result from the search engine, database searching portion 267 outputs the received search result to display control portion 265.

When display control portion 265 receives a search result from database searching portion 267, display control portion 265 displays the search result on display portion 207. Display control portion 265 may display the search result in place of the image of the process target part of data 91 being displayed on display portion 207, or the search result may be overlaid on the image of the process target part.

Print control portion 271 receives a process target part from target part extracting portion 253 and, in response to an input by a user of a print instruction to operation portion 208, transmits the process target part and a print request via wireless LAN I/F 209 to MFP 100, to cause the MFP to form an image of the process target part on a sheet of paper. When MFP 100 receives the process target part and the print request from mobile information device 200, MFP 100 forms an image of the process target part on a sheet of paper. Specifically, print control portion 271 displays a print setup screen on display portion 207, accepts print settings input to operation portion 208 by the user, and transmits the print request including the print settings to MFP 100. The print settings refer to information determining the conditions for MFP 100 to form an image. The print settings include, for example, the number of pages of images to be formed, the paper size, and so on.

Storage control portion 273 receives a process target part from target part extracting portion 253 and, in response to an input by a user of a storage instruction to operation portion 208, transmits the process target part and a storage request via wireless LAN I/F 209 to MFP 100, to cause the MFP to store the process target part in HDD 116. When MFP 100 receives the process target part and the storage request from mobile information device 200, MFP 100 stores the process target part in an area of HDD 116 specified by the storage request. Specifically, storage control portion 273 displays a storage setup screen on display portion 207, accepts storage settings input to operation portion 208 by the user, and transmits the storage request including the storage settings to MFP 100. The storage settings refer to information determining the conditions for MFP 100 to store the process target part. The storage settings include, for example, information identifying a storage area, or a folder, included in HDD 116, the data format, and so on.

Transmission control portion 275 receives a process target part from target part extracting portion 253 and, in response to an input by a user of a transmission instruction to operation portion 208, transmits the process target part via wireless LAN I/F 209. Specifically, transmission control portion 275 displays a transmission setup screen on display portion 207, accepts transmission settings input by the user to operation portion 208, and transmits the process target part in accordance with the accepted transmission settings. The transmission settings refer to information determining the conditions for transmission of the process target part. The transmission settings include, for example, an e-mail address of the destination, a comment to be included in the e-mail, and so on.

Figure 7:
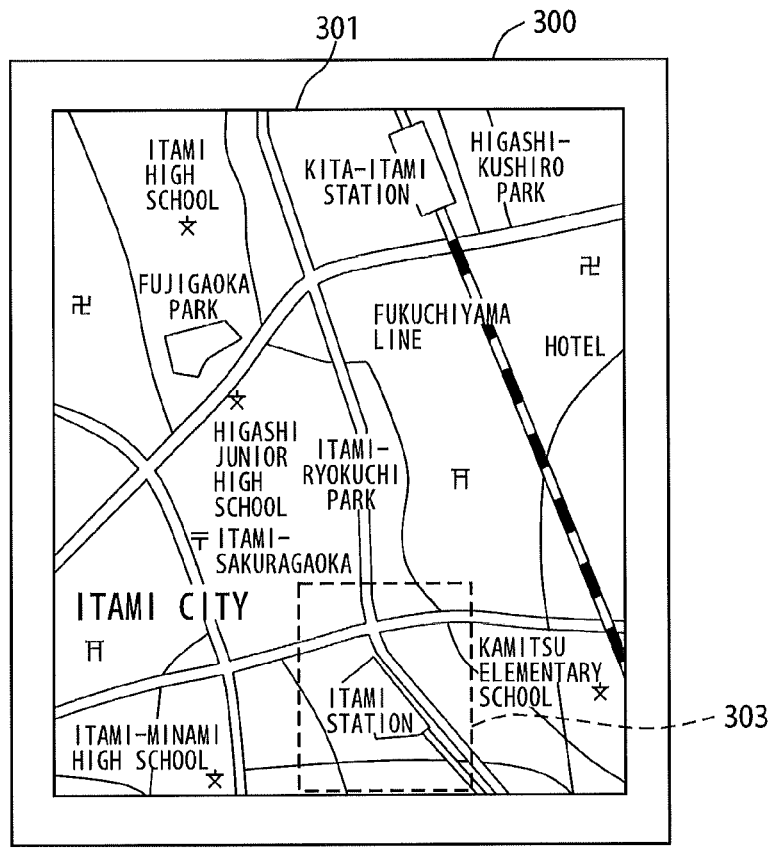
FIG. 7 shows an example of a sheet of paper having an image formed thereon by the MFP.

FIG. 7 shows an example of a sheet of paper on which an image has been formed by the MFP. Referring to FIG. 7, a sheet of paper 300 has an image 301 of a road map formed thereon. An area 303 indicates a photographing range of camera 204 included in mobile information device 200.

Figure 8:
FIG. 8 shows an example of a screen displayed by the mobile information device.

FIG. 8 shows an example of a screen displayed on the mobile information device. Referring to FIG. 8, a screen 305 includes an image of the process target part of data 91 that corresponds to area 303 in image 301 shown in FIG. 7. Screen 305 includes more detailed information than in area 303 shown in FIG. 7.

Figure 9:
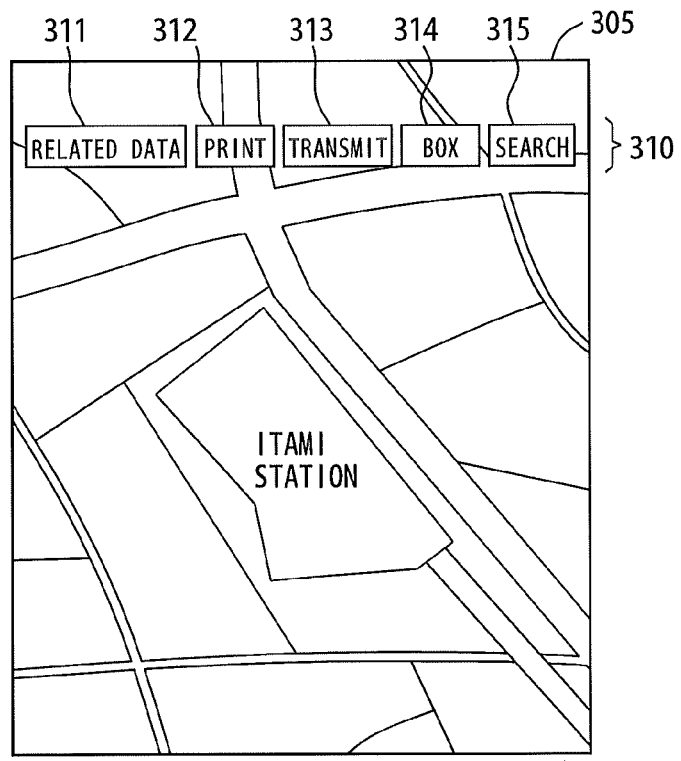
FIG. 9 shows an example of a menu screen.

FIG. 9 shows an example of a menu screen. Referring to FIG. 9, a menu screen 310 is displayed overlaid on the screen shown in FIG. 8. Menu screen 310 includes a button 311 having a related data acquiring instruction assigned thereto, a button 312 having a print instruction assigned thereto, a button 313 having a transmission instruction assigned thereto, a button 314 having a storage instruction assigned thereto, and a button 315 having a database search instruction assigned thereto.

Figure 10:
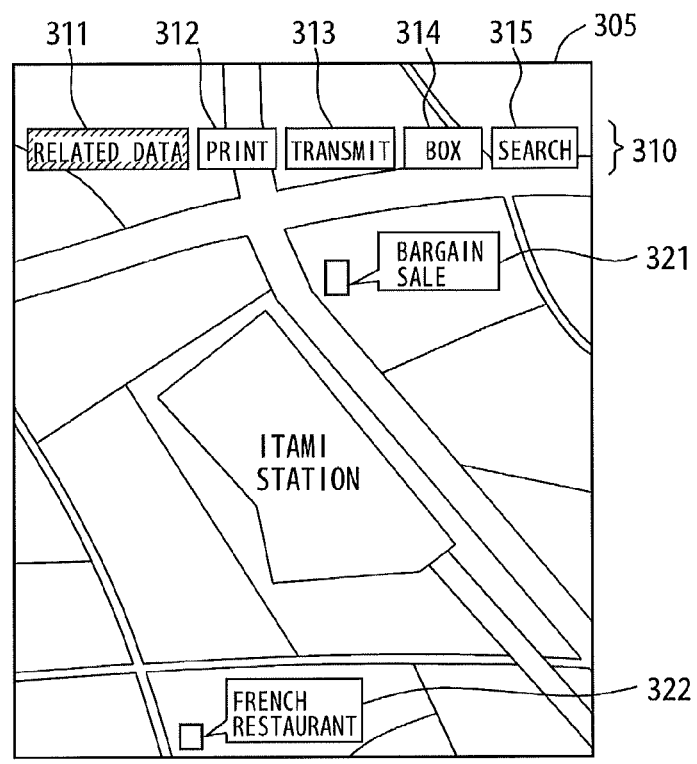
FIG. 10 shows an example of a screen on which related data is displayed.

FIG. 10 shows an example of a screen having related data displayed thereon. Referring to FIG. 10, menu screen 310 and related data 321, 322 are displayed overlaid on screen 305 shown in FIG. 9. In menu screen 310, button 311 having the related data acquiring instruction assigned thereto is highlighted, indicating that the user has designated this button 311. In the figure, button 311 is hatched to indicate the highlighted state. Related data 321 is arranged at the location of a specific shop in screen 305. Related data 321 includes characters "ON SALE", and includes information indicating that the relevant shop is having a sale. Related data 322 is arranged at the location of another specific shop in screen 305. Related data 322 includes characters "FRENCH CUISINE", and includes information indicating that the relevant shop serves French cuisine.

Figure 11:
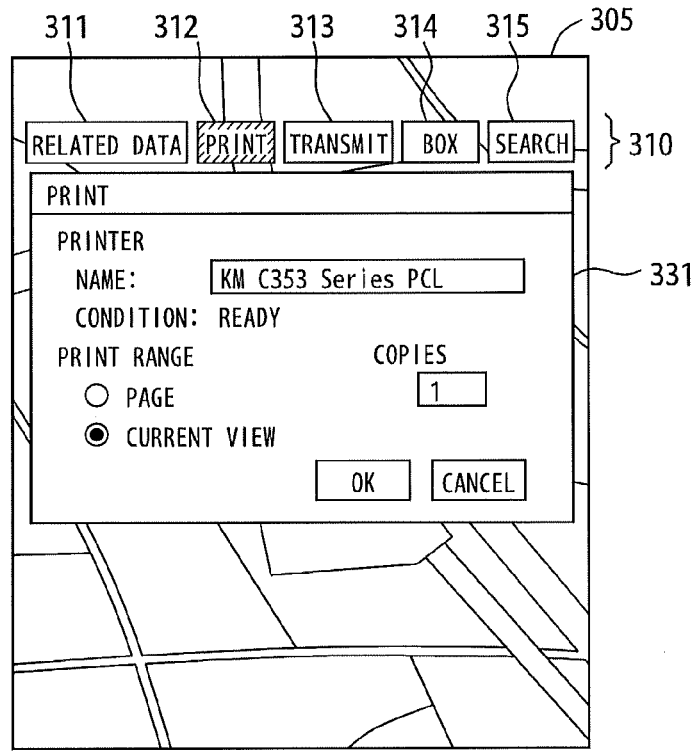
FIG. 11 shows an example of a print setup screen.

FIG. 11 shows an example of a print setup screen. Referring to FIG. 11, menu screen 310 and a print setup screen 331 are displayed overlaid on screen 305 shown in FIG. 9. In menu screen 310, button 312 having the print instruction assigned thereto is highlighted, indicating that the user has designated this button 312. In the figure, button 312 is hatched to indicate the highlighted state. Print setup screen 331 includes a field for designating a printer, a field for designating a print range, a button having characters "OK" displayed thereon, and a button having characters "CANCEL" displayed thereon. When the "OK" button is designated, the process target part and print settings are transmitted on the basis of the print settings set in the fields for designating the printer and the print range.

Figure 12:
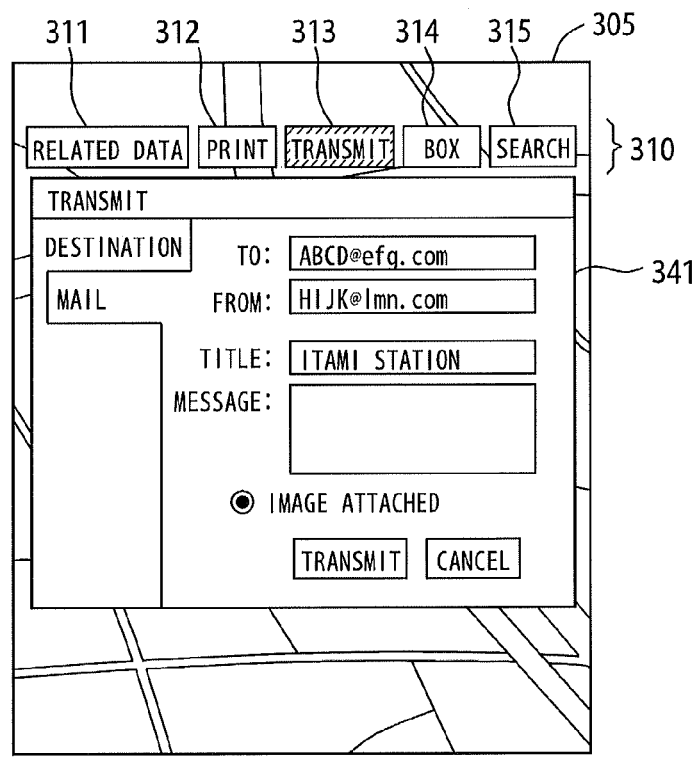
FIG. 12 shows an example of a transmission setup screen.

FIG. 12 shows an example of a transmission setup screen. Referring to FIG. 12, menu screen 310 and a transmission setup screen 341 are displayed overlaid on screen 305 shown in FIG. 9. In menu screen 310, button 313 having the transmission instruction assigned thereto is highlighted, indicating that the user has designated this button 313. In the figure, button 313 is hatched to indicate the highlighted state. Transmission setup screen 341 includes a field for designating an e-mail address as a destination, a field for designating a user's e-mail address as a sender, a field for inputting a title, a field for inputting a message, a button having characters "TRANSMIT" displayed thereon, a button having characters "CANCEL" displayed thereon, and a radio button for setting whether to attach an image of the process target part to the e-mail. When the "TRANSMIT" button is designated, e-mail is generated and transmitted to an e-mail server.

Figure 13:
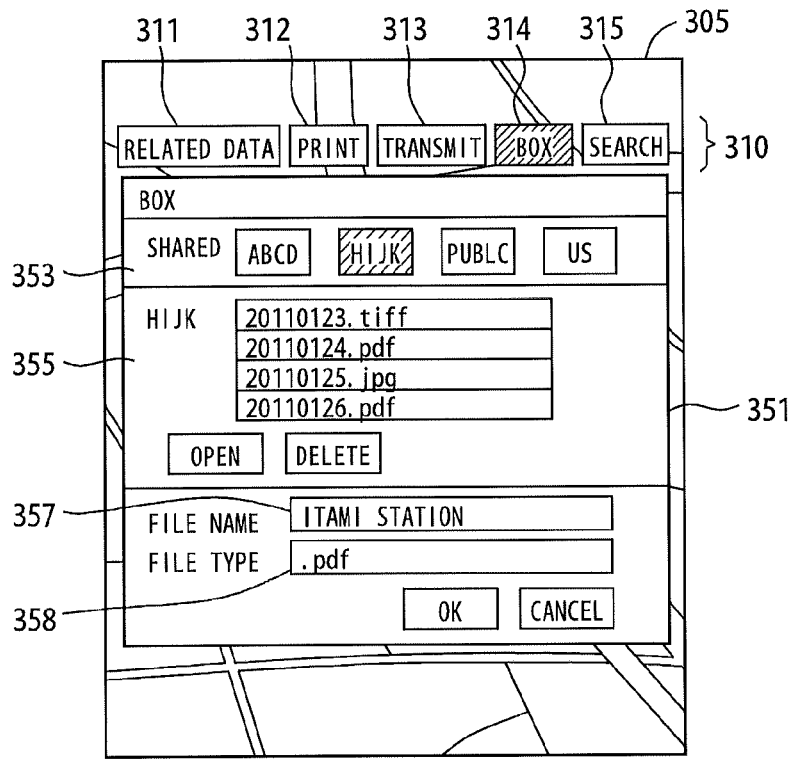
FIG. 13 shows an example of a storage setup screen.

FIG. 13 shows an example of a storage setup screen. Referring to FIG. 13, menu screen 310 and a storage setup screen 351 are displayed overlaid on screen 305 shown in FIG. 9. In menu screen 310, button 314 having the storage instruction assigned thereto is highlighted, indicating that the user has designated this button 314. In the figure, button 314 is hatched to indicate the highlighted state. Storage setup screen 351 includes a field 353 in which a plurality of storage areas included in HDD 116 of MFP 100 are displayed in a selectable manner, a field 355 in which file names of data stored in the selected storage area are displayed, a field 357 for designating a file name, a field 358 for designating the file format, a button having characters "OK" displayed thereon, and a button having characters "CANCEL" displayed thereon. In field 353, folder names "ABCD", "HIJK", "PUBLC", and "US" assigned to the respective storage areas in HDD 116 are displayed in a selectable manner. Here, the folder name "HIJK" is selected and highlighted. In the figure, hatching indicates the highlighted state. Further, field 355 includes a list of pieces of data identification information of the data being stored in the folder selected in field 353, a button having characters "OPEN" displayed thereon, and a button having characters "DELETE" displayed thereon. When a user selects one of the pieces of data identification information and designates either the "OPEN" or "DELETE" button, the processing of displaying or deleting the data, corresponding to the designated button, is performed on the data specified by the selected data identification information.

In field 357, data identification information of the data as the process target part is input. Here, the data identification information reads "ITAMI STATION". In field 358, the data format of the process target part is input. Here, it is assumed that the data format "pdf" has been set. When the "OK" button is designated, the process target part of source data 91 and a storage instruction are transmitted to MFP 100. In MFP 100, the process target part of source data 91 is converted into the "pdf" format, and then stored as a file named "ITAMI STATION" into the "HIJK" folder in HDD 116.

Figure 14:
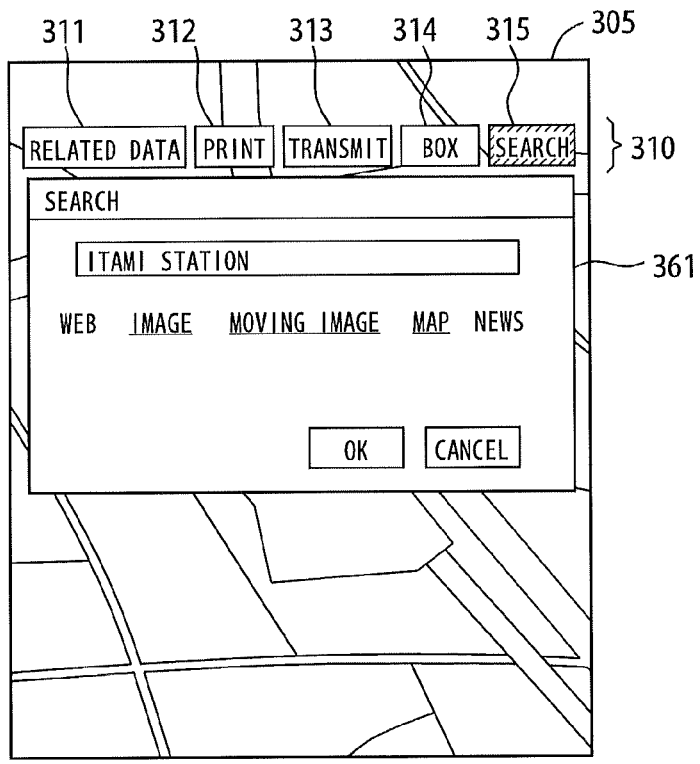
FIG. 14 shows an example of a search setup screen.

FIG. 14 shows an example of a database search setup screen. Referring to FIG. 14, menu screen 310 and a database search setup screen 361 are displayed overlaid on screen 305 shown in FIG. 9. In menu screen 310, button 315 having the database search instruction assigned thereto is highlighted, indicating that the user has designated this button 315. In the figure, button 315 is hatched to indicate the highlighted state. Database search setup screen 361 is a screen received from a search engine, and has a field for inputting a search key in which the characters "ITAMI STATION", located near the center of screen 305, are entered. When an "OK" button provided is designated, a database search request with "ITAMI STATION" as a search key is transmitted to the search engine.

Figure 15:
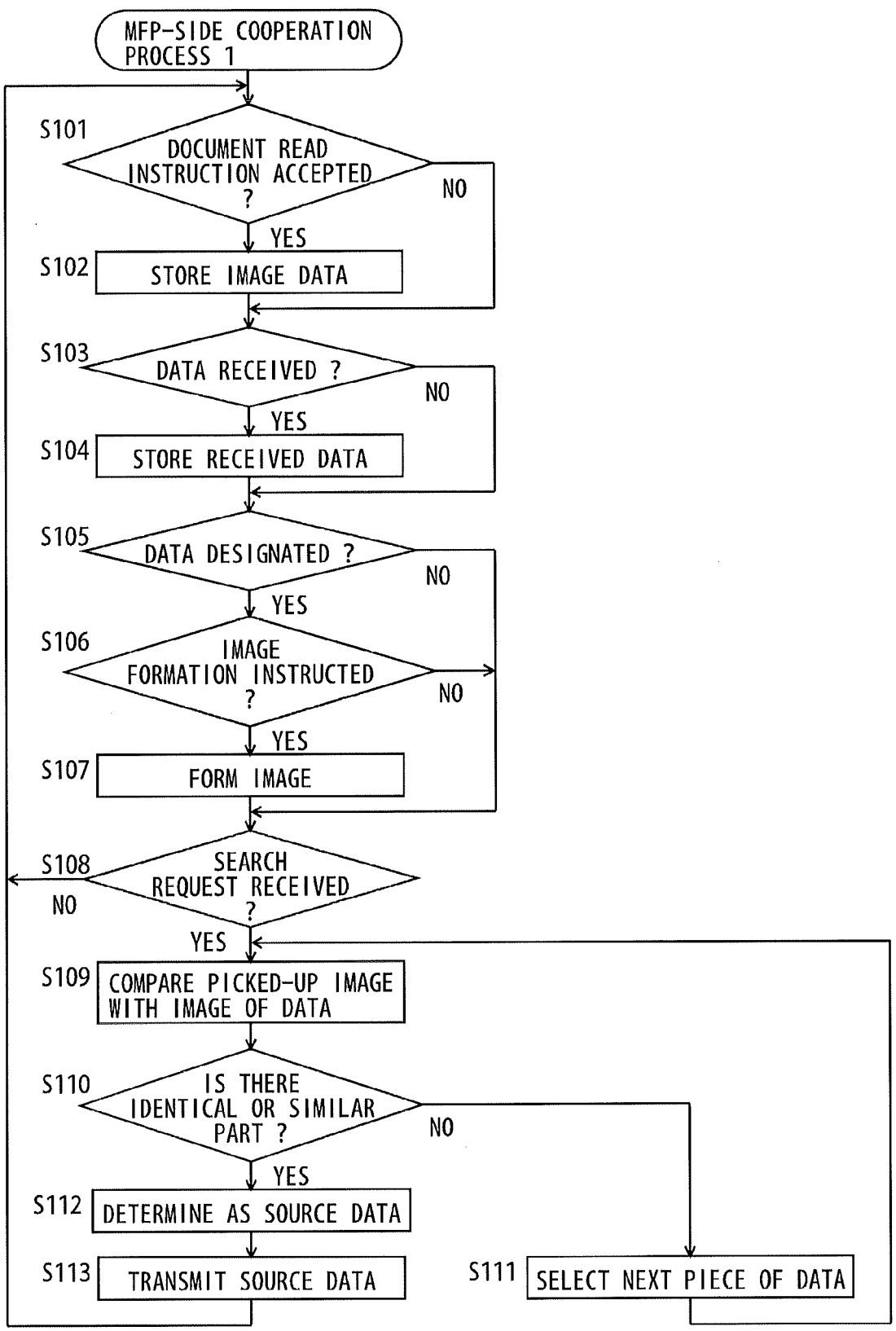
FIG. 15 is a flowchart illustrating an example of the flow of an MFP-side cooperation process according to the first embodiment.

FIG. 15 is a flowchart illustrating an example of the flow of an MFP-side cooperation process according to the first embodiment. The MFP-side cooperation process is carried out by CPU 111 included in MFP 100 as CPU 111 executes an MFP-side cooperation program stored in ROM 113, HDD 116, EEPROM 115, or CD-ROM 118A. Referring to FIG. 15, CPU 111 determines whether a document read instruction has been accepted (step S101). When the user inputs an operation of setting a document read mode to operation portion 160B and depresses a start key, the document read instruction is accepted. If the document read instruction has been accepted, the process proceeds to step S102; otherwise, the process proceeds to step S103, with step S102 being skipped. In step S102, CPU 111 controls document reading portion 130 to read a document, and acquires image data output from document reading portion 130. CPU 111 then stores the acquired image data as data 91 in HDD 116, and the process proceeds to step S103. In step S103, CPU 111 determines whether communication I/F portion 112 has received data.

If so, the process proceeds to step S104; otherwise, the process proceeds to step S105, with step S104 being skipped. In step S104, CPU 111 stores the received data as data 91 in HDD 116, and the process proceeds to step S105. The data received by communication I/F portion 112 includes application data and print data received from PC 105, and further includes a Web page downloaded from a server connected to the Internet.

In step S105, CPU 111 determines whether a designation of data has been accepted. When the user inputs to operation portion 160B an operation of designating a process target from data 91 stored in HDD 116, the designation of data is accepted. If the designation of data has been accepted, the process proceeds to step S106; otherwise, the process proceeds to step S108. In step S106, CPU 111 determines whether an image forming instruction has been accepted. When the user inputs to operation portion 160B an operation of setting an image forming mode and depresses a start key, the image forming instruction is accepted. The image forming instruction includes conditions for forming an image, such as a scaling factor, paper size, etc. If the image forming instruction has been accepted, the process proceeds to step S107; otherwise, the process proceeds to step S108. In step S107, CPU 111 controls image forming portion 140 to form an image of the data designated in step S105, and the process proceeds to step S108.

It is noted that a copy instruction as a combination of the document read instruction and image forming instruction may be accepted. In such a case, the processing in steps S102 and S107 is carried out. In other words, the image data that document reading portion 130 has output by reading a document is stored as data 91 in HDD 116, and an image of the image data output from document reading portion 130 is formed by image forming portion 140.

In step S108, CPU 111 determines whether a search request has been received. Specifically, it is determined whether communication I/F portion 112 has received the search request from mobile information device 200. If the search request has been received, the process proceeds to step S109; otherwise, the process returns to step S101. In step S109, CPU 111 selects one of a plurality of pieces of data 91 stored in HDD 116, and compares the image of the selected piece of data 91 with the picked-up image contained in the search request. Specifically, the entirety of the picked-up image is compared with at least a part of the image of data 91.

The process then branches in accordance with the result of comparison (step S110). CPU 111 determines whether the image of data 91 includes a part identical to or similar to the picked-up image. If there is a part identical to or similar to the picked-up image in the image of data 91, the process proceeds to step S112; otherwise, the process proceeds to step S111. In step S111, CPU 111 selects another piece of data 91 stored in HDD 116, and the process returns to step S109. If all the pieces of data 91 stored in HDD 116 have been selected as the process target, a signal indicating that there is no source data may be transmitted via communication I/F portion 112 to the mobile information device that has issued the search request, and then, the process may return to step S101.

In step S112, the data selected as the process target in step S109 is determined as the source data, and the process proceeds to step S113. In step S113, CPU 111 transmits the source data via communication I/F portion 112 to mobile information device 200 that has issued the search request, and the process returns to step S101.

Figure 16:
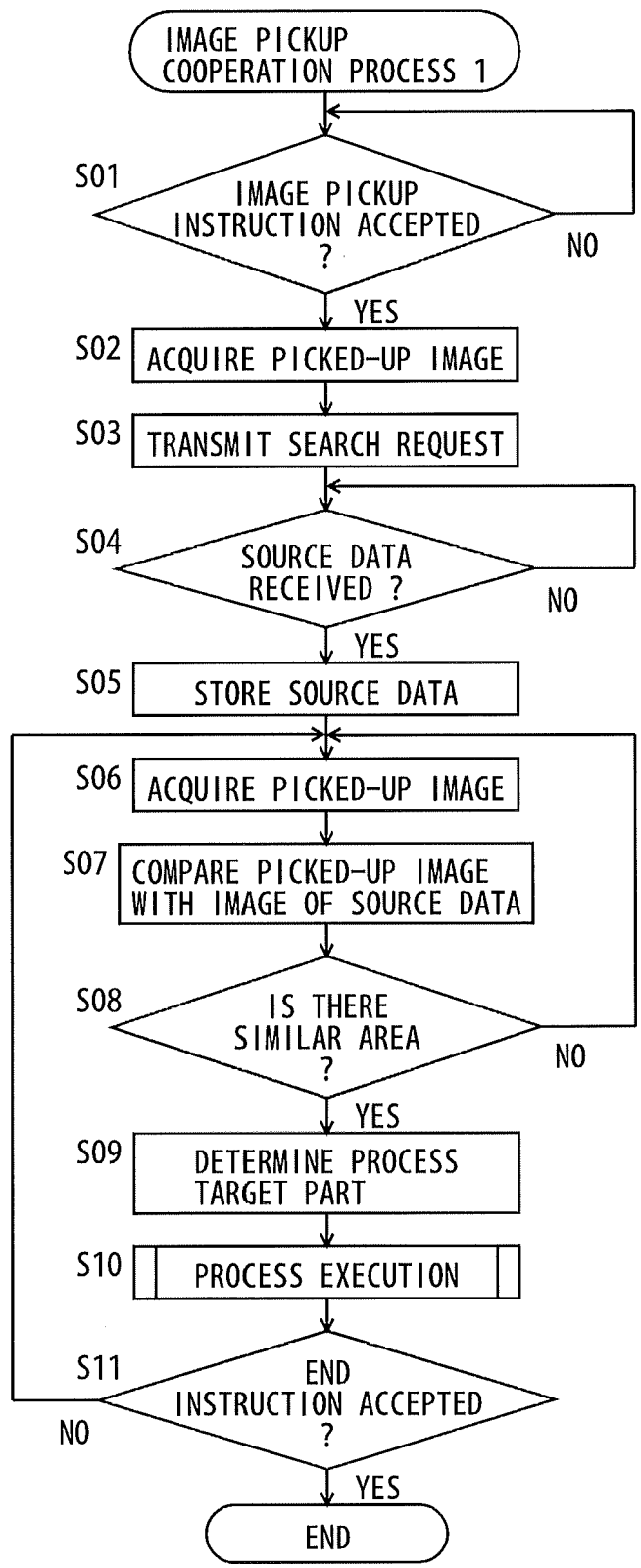
FIG. 16 is a flowchart illustrating an example of the flow of an image pickup cooperation process according to the first embodiment.

FIG. 16 is a flowchart illustrating an example of the flow of an image pickup cooperation process according to the first embodiment. The image pickup cooperation process is carried out by CPU 201 included in mobile information device 200 as CPU 201 executes an image pickup cooperation program stored in flash memory 203 or 210A.

Referring to FIG. 16, CPU 201 determines whether an image pickup instruction has been accepted (step S01). When the user operation of depressing a shutter button prepared in operation portion 208 for instructing an image pickup has been detected, the image pickup instruction is accepted. CPU 201 is in a standby mode until an image pickup instruction is accepted, and once the image pickup instruction is accepted, the process proceeds to step S02. In step S02, CPU 201 controls camera 204 to pick up an image of a subject, and acquires a picked-up image output from camera 204. Here, when the user of mobile information device 200 chooses as a subject a sheet of paper having an image formed thereon by MFP 100 and depresses the shutter button, the picked-up image acquired is that of the image formed on the sheet.

In step S03, CPU 201 transmits a search request. Specifically, the search request including the picked-up image acquired in step SO2 is transmitted via wireless LAN I/F 209 to MFP 100. MFP 100 that has received the search request returns source data including an image that is at least partially identical to or similar to the picked-up image. In the following step S04, CPU 201 is in a standby mode until wireless LAN I/F 209 receives source data 91 from MFP 100, and once the source data is received ("YES" in step S04), the process proceeds to step S05. In step S05, CPU 201 stores the received source data in flash memory 203, and the process proceeds to step S06.

In step S06, CPU 201 acquires a picked-up image. Camera 204 outputs moving images by picking up the image of the subject from when the image pickup instruction is accepted in step S01. The moving images include a plurality of still images arranged at prescribed time intervals. Here in step S06, one of the still images constituting the moving images is acquired as the picked-up image. In the following step S07, CPU 201 compares the picked-up image with the image of the source data received from MFP 100 in step S04. Specifically, the entirety of the picked-up image is compared with at least a part of the image of the source data.

The process then branches in accordance with the result of comparison (step S08). CPU 201 determines whether the image of the source data includes an area identical to or similar to the picked-up image. If there is an area identical to or similar to the picked-up image in the image of the source data, the process proceeds to step S09; otherwise, the process returns to step S06.

In step S09, CPU 201 determines a process target part in the source data. Specifically, the part of the source data corresponding to the area identical to or similar to the picked-up image, extracted from within the image of the source data in step S08, is determined as the process target part.

In the following step S10, CPU 201 carries out a process executing process. The process executing process, which will be described later in detail, is a process of performing prescribed processing on the process target part of the source data determined in step S09. In the following step S11, CPU 201 determines whether an end instruction has been accepted. When the user operation of depressing a stop button prepared in operation portion 208 for instructing an end of the image pickup cooperation process is detected, the end instruction is accepted. If the end instruction has been accepted, the process is terminated; otherwise, the process returns to step S06. In step S06, the still image output from camera 204 at the time of execution of step S06 is acquired as the picked-up image, and the processing in steps S07 and on is repeated.

Figure 17:
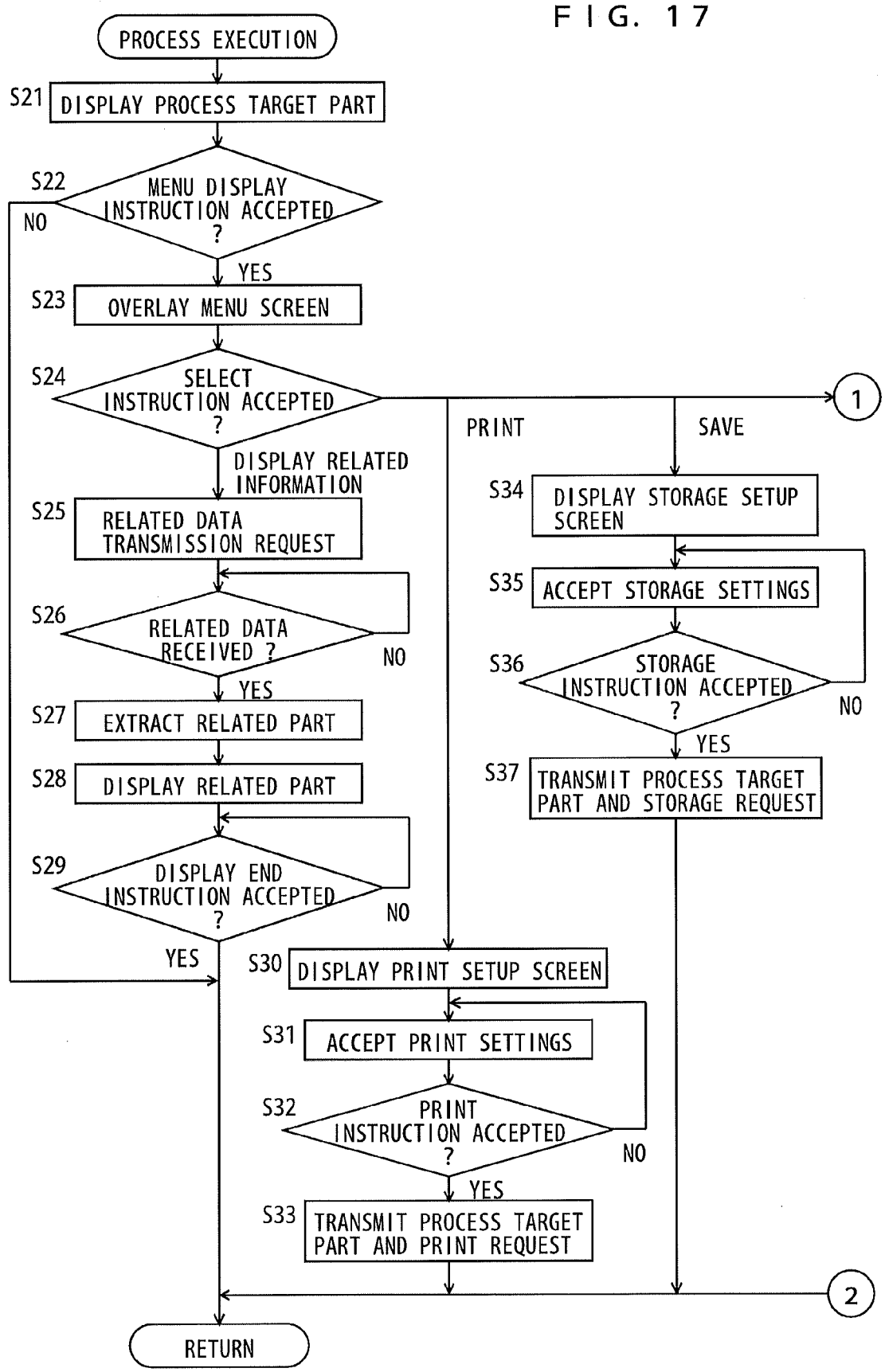
FIGS. 17 and 18 show a flowchart illustrating an example of the flow of a process executing process.
Figure 18:
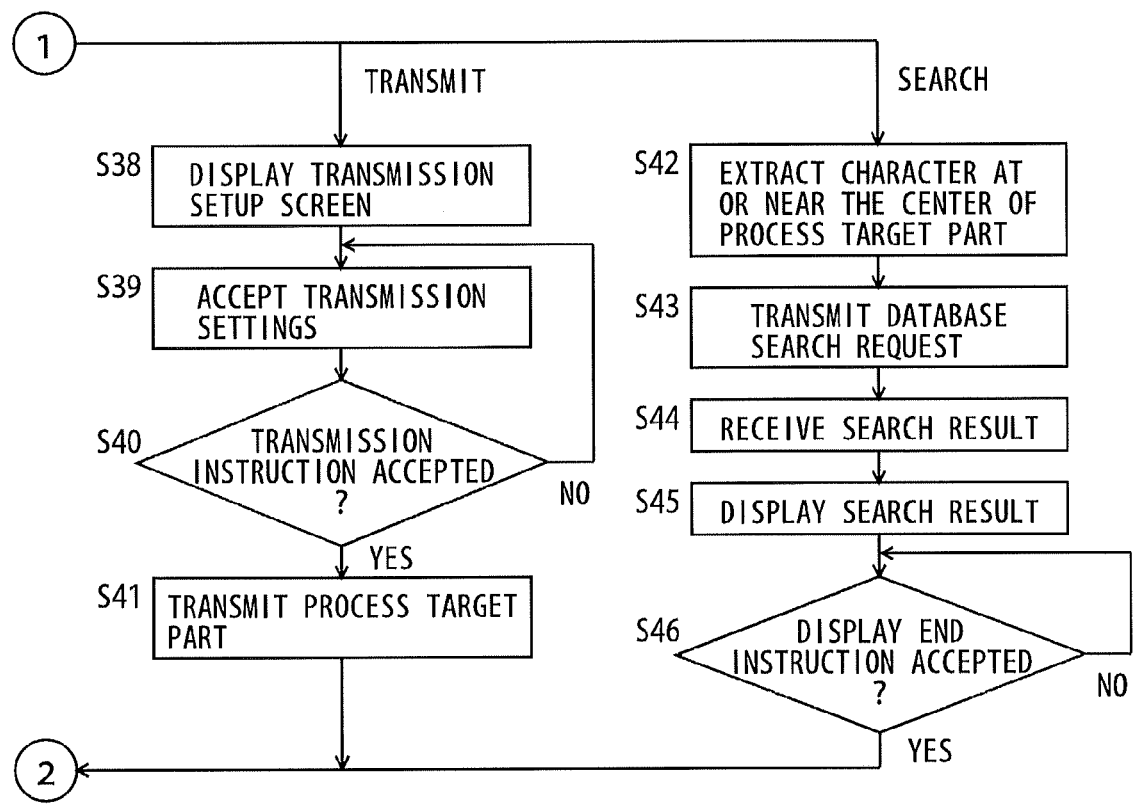

FIGS. 17 and 18 show a flowchart illustrating an example of the flow of the process executing process, which is carried out in step S10 in FIG. 16. In step S09 preceding step S10 in FIG. 16, the process target part in the source data has been determined. The process executing process is performed on that process target part.

Referring to FIGS. 17 and 18, CPU 201 displays the process target part on display portion 207 (step S21). The process target part is at least a part of data 91 that corresponds to an area of the image of data 91 determined to be identical to or similar to the picked-up image output from camera 204. As such, the image of the source data, different from the picked-up image, is displayed, enabling a detailed image having a greater amount of information than the picked-up image to be displayed.

In the following step S22, CPU 201 determines whether a menu display instruction has been accepted. When the user operation of depressing a menu display instruction button prepared in operation portion 208 for instructing the display of the menu is detected, the menu display instruction is accepted. If the menu display instruction has been accepted, the process proceeds to step S23; otherwise, the process returns to the image pickup cooperation process.

In step S23, CPU 201 displays a menu screen on display portion 207 so as to be overlaid on the image of the process target part being displayed on display portion 207. The menu screen includes a plurality of buttons for selecting different processes. Here, the buttons included in the menu screen include: a button for selecting a related information displaying process, a button for selecting a printing process, a button for selecting a saving process, a button for selecting a transmitting process, and a button for selecting a database searching process.

In the following step S24, CPU 201 determines whether an instruction to select one of the processes has been accepted. When the user operation of depressing one of the buttons included in the menu screen is detected, a select instruction is accepted. When the select instruction is accepted, the process branches in accordance with the button depressed. If the button for selecting the related information displaying process has been depressed, the process proceeds to step S25. If the button for selecting the printing process has been depressed, the process proceeds to step S30. If the button for selecting the saving process has been depressed, the process proceeds to step S34. If the button for selecting the transmitting process has been depressed, the process proceeds to step S38. If the button for selecting the database searching process has been depressed, the process proceeds to step S42.

In step S25, CPU 201 transmits a related data transmission request. Specifically, CPU 201 transmits the related data transmission request including the data identification information of source data 91 to MFP 100 via wireless LAN I/F 209. When MFP 100 receives the related data transmission request, MFP 100 returns related data 93 that is related to the data 91 specified by the data identification information included in the related data transmission request. In the following step S26, CPU 201 is in a standby mode until related data is received from MFP 100. Once wireless LAN I/F 209 receives related data 93 from MFP 100, the process proceeds to step S27.

In step S27, CPU 201 extracts, from the received related data, a related part corresponding to the process target part. The related data includes information related to the source data or information as a supplement to the source data. Thus, from the related data, a part including the information related to the process target part or a part including the information supplementing the process target part is extracted as the related part. In the case where a plurality of parts of the source data and a plurality of parts of the related data have been associated with each other in advance, one of the parts of the related data that has been associated with the process target part is extracted as the related part. Still alternatively, from the related data, a part including the same character as the one included in the process target part, or a part within a prescribed range from that character, may be extracted as the related part.

In the following step S28, the related part extracted in step S27 is displayed on display portion 207. Here, the image of the related part is displayed overlaid on the image of the process target part being displayed on display portion 207.

In the following step S29, CPU 201 determines whether a display end instruction has been accepted. When the user operation of depressing a display end instruction button prepared in operation portion 208 for instructing an end of the display of the related part is detected, the display end instruction is accepted. CPU 201 is in a standby mode until a display end instruction is accepted ("NO" in step S29), and once the display end instruction is accepted ("YES" in step S29), the process returns to the image pickup cooperation process.

In step S30, CPU 201 displays a print setup screen on display portion 207. The print setup screen is a screen for accepting the conditions for MFP 100 to form an image. In the following step S31, CPU 201 accepts the print settings. When the user inputs to operation portion 208, in accordance with the print setup screen, the information determining the conditions for MFP 100 to form an image, the information input to operation portion 208 is accepted as the print settings. In the following step S32, CPU 201 determines whether a print instruction has been accepted. When the user operation of depressing a print instruction button prepared in operation portion 208 for instructing printing is detected, the print instruction is accepted. If the print instruction has been accepted, the process proceeds to step S33; otherwise, the process returns to step S31.

In step S33, CPU 201 transmits the process target part and a print request, and the process returns to the image pickup cooperation process. More specifically, CPU 201 transmits the process target part and the print request to MFP 100 via wireless LAN I/F 209. The print request includes the print settings accepted in step S31. When MFP 100 receives the process target part and the print request, MFP 100 forms an image of the process target part on a sheet of paper in accordance with the print settings included in the print request.

In step S34, CPU 201 displays a storage setup screen on display portion 207. The storage setup screen is a screen for accepting storage settings as the conditions for MFP 100 to store data. The storage settings include information determining the conditions for MFP 100 to store data, and include, for example, information about the folders in HDD 116, the data format, etc.

In the following step S35, CPU 201 accepts the storage settings. When the user inputs to operation portion 208, in accordance with the storage setup screen, information determining the conditions for MFP 100 to store data, the information input to operation portion 208 is accepted as the storage settings. In the following step S36, CPU 201 determines whether a storage instruction has been accepted. When the user operation of depressing a storage instruction button prepared in operation portion 208 for instructing storage is detected, the storage instruction is accepted. If the storage instruction has been accepted, the process proceeds to step S37; otherwise, the process returns to step S35.

In step S37, CPU 201 transmits the process target part and a storage request, and the process returns to the image pickup cooperation process. More specifically, CPU 201 transmits the process target part and the storage request to MFP 100 via wireless LAN I/F 209. The storage request includes the storage settings accepted in step S35. When MFP 100 receives the process target part and the storage request, MFP 100 stores the process target part in HDD 116 in accordance with the storage settings included in the storage request.

In step S38, CPU 201 displays a transmission setup screen on display portion 207. The transmission setup screen is a screen for accepting transmission settings as the conditions for transmitting data. The transmission settings include information determining the conditions for data transmission, which include, for example, an e-mail address of the destination, a comment to be included in the e-mail, etc.

In the following step S39, CPU 201 accepts the transmission settings. When the user inputs to operation portion 208, in accordance with the transmission setup screen, information determining the conditions for transmitting data, the information input to operation portion 208 is accepted as the transmission settings. In the following step S40, CPU 201 determines whether a transmission instruction has been accepted. When the user operation of depressing a transmission instruction button prepared in operation portion 208 for instructing transmission is detected, the transmission instruction is accepted. If the transmission instruction has been accepted, the process proceeds to step 41; otherwise, the process returns to step S39.

In step S41, CPU 201 transmits the process target part, and the process returns to the image pickup cooperation process. More specifically, CPU 201 generates e-mail which has the e-mail address included in the transmission settings set as the destination and which has the process target part attached thereto, and transmits the generated e-mail to an e-mail server via wireless LAN I/F 209.

In step S42, CPU 201 extracts a character located at or near the center of the process target part. In the case where the source data is an image, the character is extracted by subjecting the process target part to character recognition processing. In the following step S43, CPU 201 transmits a database search request to a search engine. The database search request includes the character extracted in step S42 as a search key. More specifically, CPU 201 transmits the database search request, including the character extracted in step S42 as the search key, to a predetermined search engine via wireless LAN I/F 209. The search engine may be, for example, a search site connected to the Internet.

In the following step S44, CPU 201 receives a search result returned from the search engine. CPU 201 then displays on display portion 207 the search result received from the search engine via wireless LAN I/F 209 (step S45). Here, the search result may be displayed in place of the image of the process target part being displayed on display portion 207, or may be displayed overlaid on the image of the process target part.

In the following step S46, CPU 201 determines whether a display end instruction has been accepted. When the user operation of depressing a display end instruction button prepared in operation portion 208 for instructing an end of the display of the search result is detected, the display end instruction is accepted. CPU 201 is in a standby mode until a display end instruction is accepted ("NO" in step S46), and once the display end instruction is accepted ("YES" in step S46), the process returns to the image pickup cooperation process.

<Second Embodiment>

In the first embodiment of the present invention, in MFP 100, the picked-up image was compared with the images of data using the image recognition processing to specify the data corresponding to the picked-up image, and in mobile information device 200, the picked-up image was compared with the image of the source data using the image recognition processing to determine the process target part within the source data. An image processing system according to a second embodiment of the present invention differs from the system of the first embodiment in that it does not use the image recognition processing.

The image processing system 1A according to the second embodiment includes MFPs 100A, 101A, and 102A which correspond respectively to MFPs 100, 101, and 102 in the first embodiment, and a mobile information device 200A which corresponds to mobile information device 200 in the first embodiment. Image processing system 1A of the second embodiment is the same as image processing system 1 of the first embodiment in that a sheet of paper having an image formed thereon by MFP 100A is picked up by camera 204 included in mobile information device 200A. Image processing system 1A of the second embodiment is different from image processing system 1 of the first embodiment in that while the image of the sheet having an image formed thereon by MFP 100A is being picked up in mobile information device 200A, the sheet of paper should be fixed in three-dimensional space. In the following, the differences of image processing system 1A according to the second embodiment from image processing system 1 according to the first embodiment will be described primarily.

The overall structure of image processing system 1A according to the second embodiment is identical to that shown in FIG. 1. The appearance and hardware configuration of each of MFPs 100A to 102A in the second embodiment are identical to those shown in FIGS. 2 and 3. Therefore, the description thereof will not be repeated here.

Figure 19:
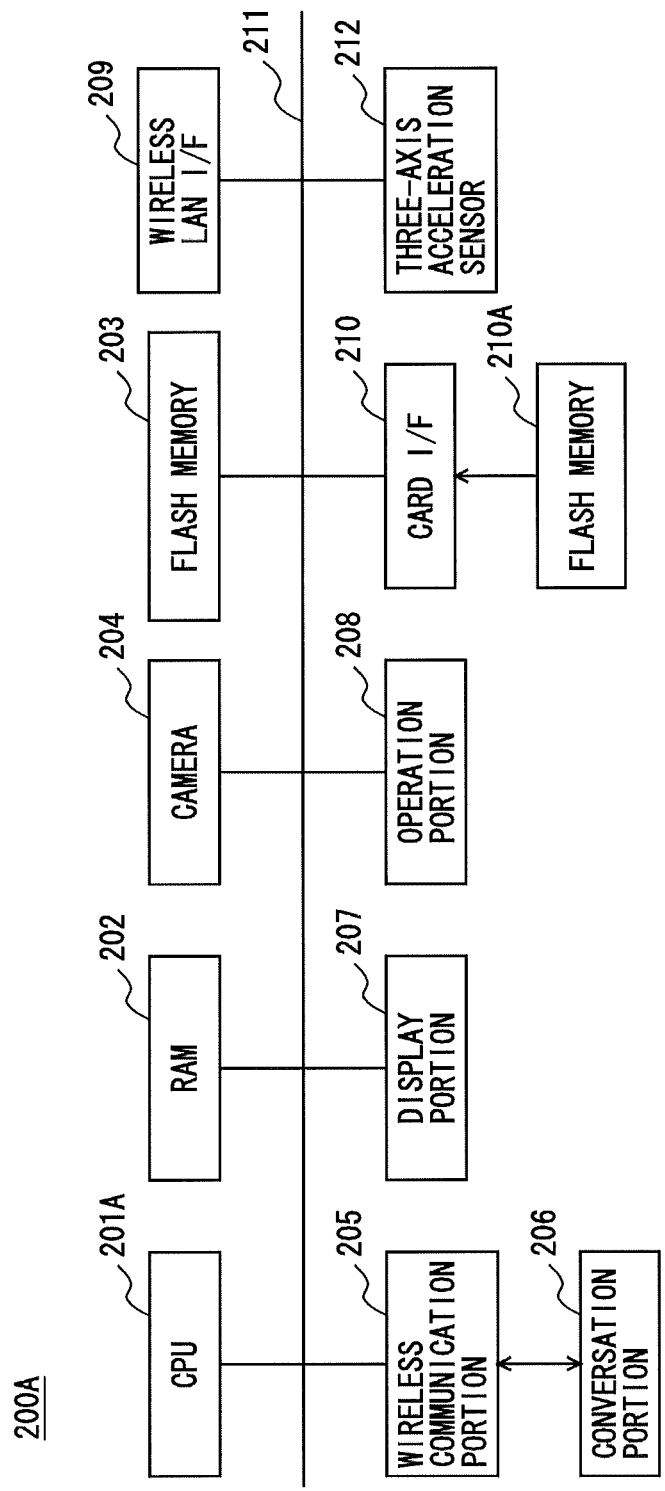
FIG. 19 is a functional block diagram schematically showing the hardware configuration of the mobile information device according to a second embodiment of the present invention.

FIG. 19 is a functional block diagram schematically showing the hardware configuration of the mobile information device according to the second embodiment. Referring to FIG. 19, the hardware configuration of mobile information device 200A of the second embodiment is different from that shown in FIG. 4 in that a three-axis acceleration sensor 212 has been added.

Three-axis acceleration sensor 212 is fixed to the main body of mobile information device 200A. Three-axis acceleration sensor 212 detects and outputs accelerations in three directions to CPU 201A. The three directions are: a Z-axis direction that is parallel to the optical axis direction of the lens included in camera 204; an X-axis direction that crosses the Z-axis direction; and a Y-axis direction that crosses both the Z-axis and X-axis directions. Here, it is assumed that the X, Y, and Z axes are perpendicular to each other.

Figure 20:
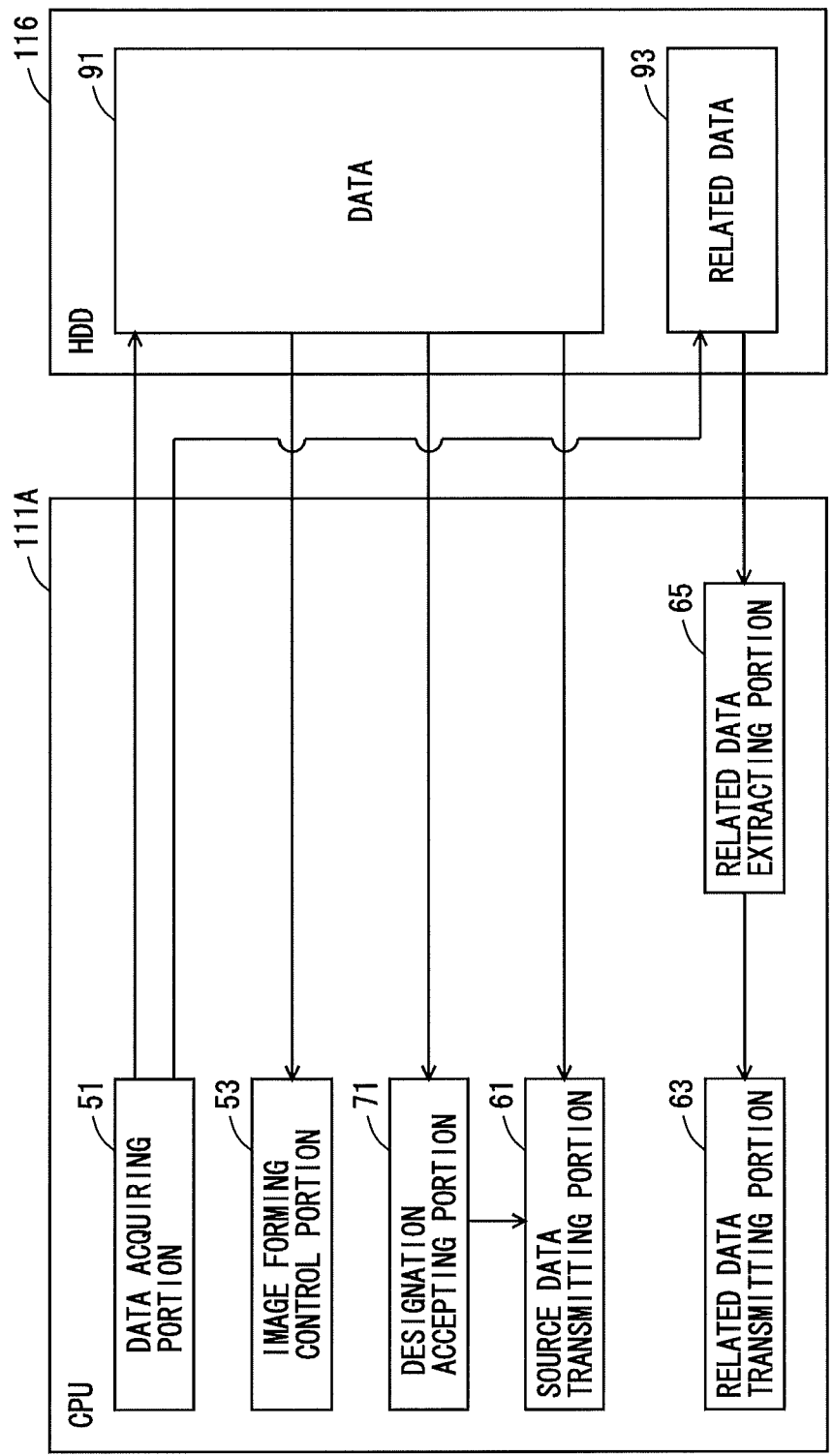
FIG. 20 is a block diagram showing, by way of example, the functions of a CPU included in the MFP according to the second embodiment.

FIG. 20 is a block diagram showing, by way of example, the functions of a CPU included in the MFP according to the second embodiment. Referring to FIG. 20, the functions of CPU 111A included in MFP 100A of the second embodiment differ from the functions shown in FIG. 5 in that search request receiving portion 55 and source data extracting portion 57 have been deleted, and a designation accepting portion 71 has been added. The other functions are the same as those shown in FIG. 5, and thus, the description thereof will not be repeated here.

Designation accepting portion 71 controls communication I/F portion 112 to receive a list screen transmission request transmitted from mobile information device 200A, which will be described later. The list screen transmission request is a signal requesting transmission of a list screen in which one or more pieces of data identification information for identifying data 91 stored in HDD 116 are listed. When designation accepting portion 71 receives the list screen transmission request, designation accepting portion 71 searches HDD 116 to generate a list screen, and transmits the generated list screen to mobile information device 200A via communication I/F portion 112.

After transmitting the list screen, when designation accepting portion 71 receives a source data transmission request from mobile information device 200A, designation accepting portion 71 reads from HDD 116 a piece of data 91 specified by the data identification information included in the received source data transmission request, and outputs the read data 91 and the device identification information of mobile information device 200A to source data transmitting portion 61.

Source data transmitting portion 61 transmits the data 91 received from designation accepting portion 71, via communication I/F portion 112, to mobile information device 200A specified by the device identification information received from designation accepting portion 71.

Figure 21:
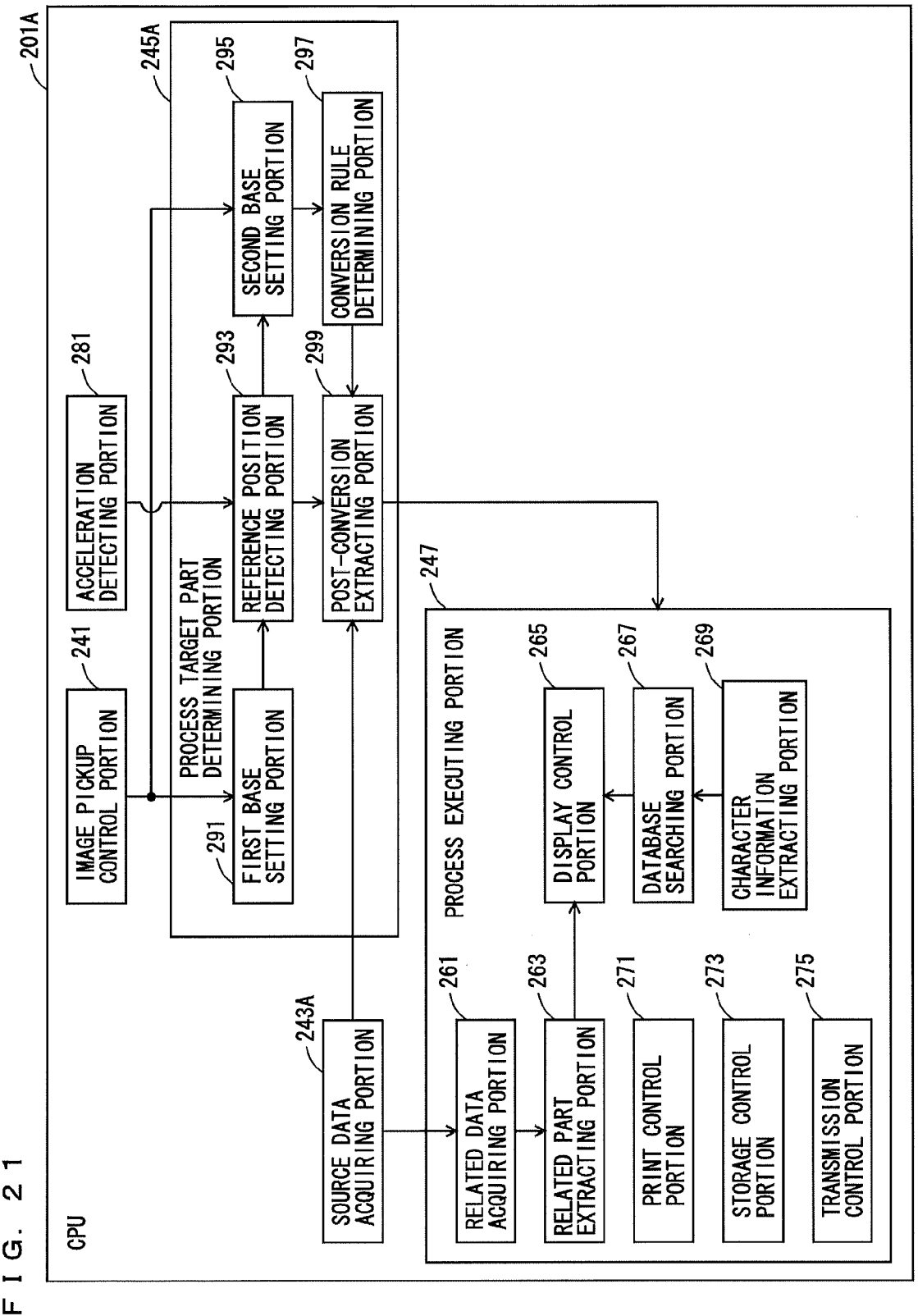
FIG. 21 is a block diagram showing, by way of example, the functions of a CPU included in the mobile information device according to the second embodiment.

FIG. 21 is a block diagram showing, by way of example, the functions of a CPU included in the mobile information device according to the second embodiment. Referring to FIG. 21, the functions of CPU 201A included in mobile information device 200A according to the second embodiment shown in FIG. 21 are formed in CPU 201A as CPU 201A executes an image pickup cooperation program stored in flash memory 203 or 210A. The image pickup cooperation program is part of the cooperation processing program.

Referring to FIG. 21, the functions of CPU 201A included in mobile information device 200A according to the second embodiment are different from those shown in FIG. 6 in that source data acquiring portion 243 and process target part determining portion 245 have been changed to a source data acquiring portion 243A and a process target part determining portion 245A, respectively, and an acceleration detecting portion 281 has been added. The other functions are the same as those shown in FIG. 6, and thus, the description thereof will not be repeated here.

Source data acquiring portion 243A transmits a list screen transmission request to MFP 100A via wireless LAN I/F 209. As previously described, when MFP 100A receives the list screen transmission request, MFP 100A returns a list screen in which one or more pieces of data identification information for identifying data 91 stored in HDD 116 are listed. When wireless LAN I/F 209 receives the list screen from MFP 100A, source data acquiring portion 243A displays the received list screen on display portion 207. After source data acquiring portion 243A displays the list screen on display portion 207, when the user inputs to operation portion 208 an operation of selecting one of the pieces of data identification information included in the list screen, source data acquiring portion 243A transmits a source data transmission request including the selected data identification information to MFP 100A via wireless LAN I/F 209. As previously described, when MFP 100A receives the source data transmission request, MFP 100A returns one of the pieces of data 91 stored in HDD 116 that is specified by the data identification information included in the source data transmission request. When wireless LAN I/F 209 receives the data 91 from MFP 100A, source data acquiring portion 243A acquires the received data 91 as the source data. Source data acquiring portion 243A outputs the acquired source data to process target part determining portion 245A, and also outputs the data identification information of the source data to process executing portion 247.

Figure 22:
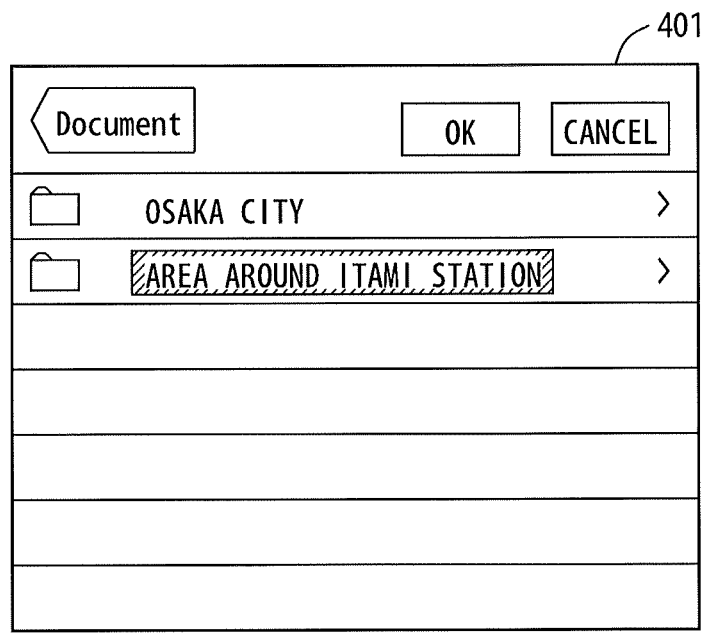
FIG. 22 shows an example of a list screen.

FIG. 22 shows an example of a list screen. Referring to FIG. 22, a list screen 401 has data identification information "OSAKA CITY" and "AREA AROUND ITAMI STATION" displayed thereon in a selectable manner. In FIG. 22, the data identification information "AREA AROUND ITAMI STATION" has been selected by the user and is thus highlighted. In the figure, hatching indicates the highlighted state.

Returning to FIG. 21, acceleration detecting portion 281 receives accelerations in three directions from three-axis acceleration sensor 212. Acceleration detecting portion 281 outputs the accelerations in three directions to process target part determining portion 245A.

Process target part determining portion 245A includes a first base setting portion 291, a reference position detecting portion 293, a second base setting portion 295, a conversion rule determining portion 297, and a post-conversion extracting portion 299.

First base setting portion 291 receives a picked-up image from image pickup control portion 241. First base setting portion 291 displays a first assist screen on display portion 207. The first assist screen, when a subject of camera 204 is a sheet of paper on which an image has been formed by MFP 100A, is a screen which defines a first photographing range within which the image formed on the sheet is to fit. The first assist screen is displayed overlaid on the picked-up image. As first base setting portion 291 displays a picked-up image overlaid with the first assist screen, the user is able to determine the photographing range by checking the first assist screen. More specifically, the user can readily perform the operation of moving the mobile information device in three-dimensional space so that the image formed on the sheet fits within the first photographing range defined in the first assist screen. The position in three-dimensional space of mobile information device 200A at the time when the image formed on the sheet fits within the first photographing range defined in the first assist screen is a first base position. When first base setting portion 291 detects the user operation of depressing the shutter button included in operation portion 208, first base setting portion 291 outputs a first base setting signal to reference position detecting portion 293.

Reference position detecting portion 293 receives a first base setting signal from first base setting portion 291 and accelerations in three directions from acceleration detecting portion 281. Reference position detecting portion 293 sets the position in three-dimensional space of mobile information device 200A at the time when the first base setting signal is input from first base setting portion 291, as the first base position (or, origin). As reference position detecting portion 293 receives the accelerations in three directions from acceleration detecting portion 281 after reception of the first base setting signal from first base setting portion 291, reference position detecting portion 293 integrates the accelerations, for each direction, to calculate a relative position of mobile information device 200A with respect to the first base position. Reference position detecting portion 293 outputs the calculated position, as a reference position, to second base setting portion 295 and post-conversion extracting portion 299.

Second base setting portion 295 receives a reference position from reference position detecting portion 293 and a picked-up image from image pickup control portion 241. Second base setting portion 295 displays a second assist screen on display portion 207. The second assist screen, when a subject of camera 204 is a sheet of paper on which an image has been formed by MFP 100A, is a screen which defines a second photographing range within which the image formed on the sheet is to fit. The second assist screen is displayed overlaid on the picked-up image. The first photographing range and the second photographing range differ from each other in size and in position in the entire photographing range of camera 204. As second base setting portion 295 displays a picked-up image overlaid with the second assist screen, the user is able to determine the photographing range by checking the second assist screen. More specifically, the user can readily perform the operation of moving the mobile information device in three-dimensional space so that the image formed on the sheet fits within the second photographing range defined in the second assist screen. The position in three-dimensional space of mobile information device 200A at the time when the image formed on the sheet fits within the second photographing range defined in the second assist screen is a second base position. Here, the second base position is represented as a reference position that is a position relative to the first base position. When second base setting portion 295 detects the user operation of depressing the shutter button included in operation portion 208, second base setting portion 295 sets the reference position being input from reference position detecting portion 293 at that time point, as the second base position. Second base setting portion 295 outputs the second base position to conversion rule determining portion 297.

Figure 23:
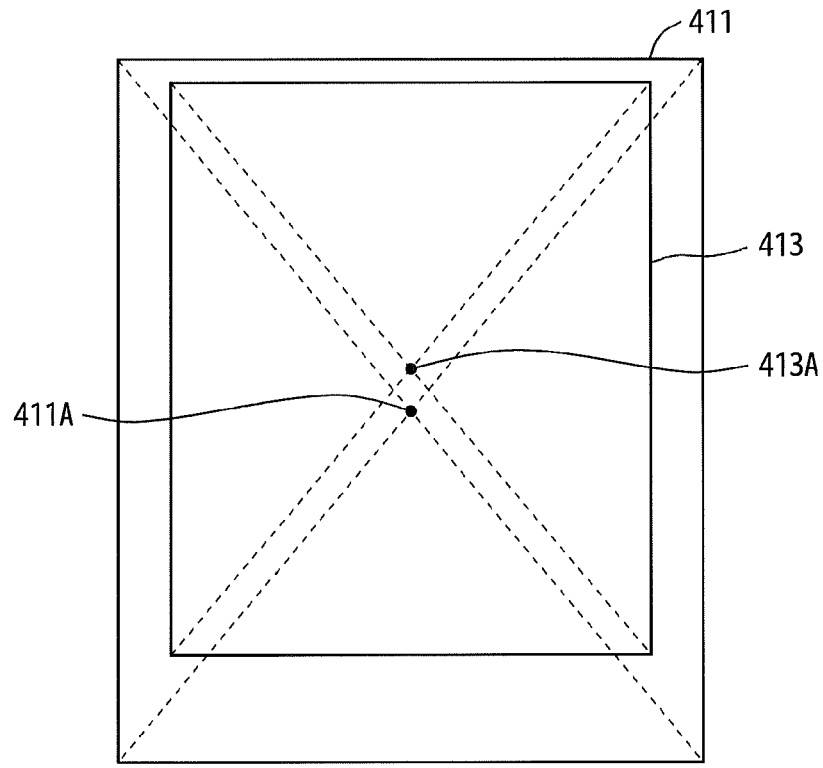
FIG. 23 shows an example of a first assist screen.

FIG. 23 shows an example of the first assist screen. Referring to FIG. 23, a first assist screen 411 includes a frame 413 indicating the first photographing range. The entirety of first assist screen 411 agrees with the entirety of photographing range of camera 204. Further, an optical axis 411A of camera 204 and the center 413A of the first photographing range are shown in first assist screen 411.

Figure 24:
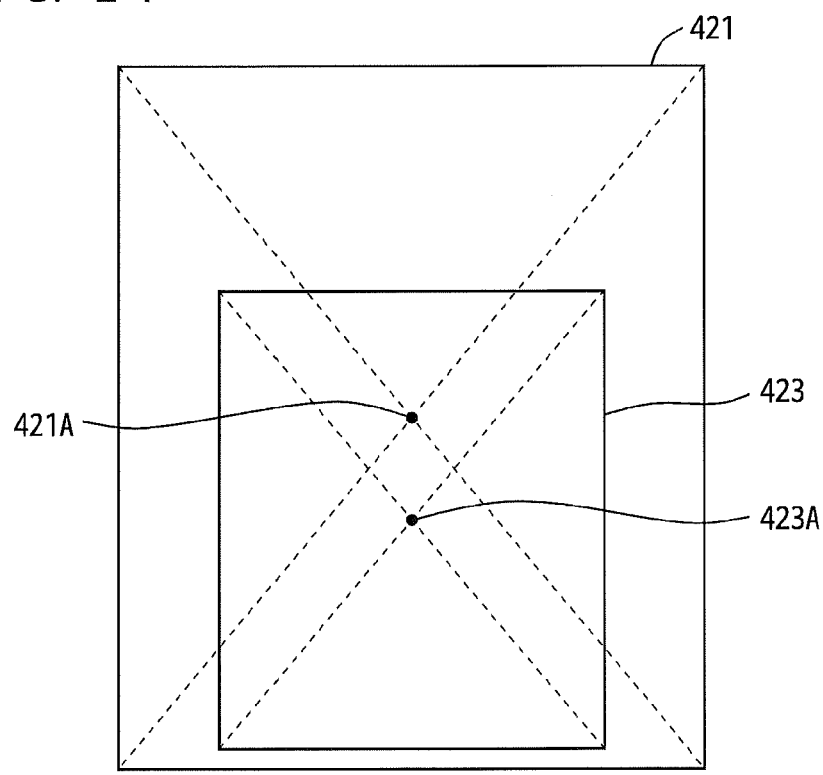
FIG. 24 shows an example of a second assist screen.

FIG. 24 shows an example of the second assist screen. Referring to FIG. 24, a second assist screen 421 includes a frame 423 indicating the second photographing range. The entirety of second assist screen 421 agrees with the entirety of photographing range of camera 204. Further, an optical axis 421A of camera 204 and the center 423A of the second photographing range are shown in second assist screen 421.

Referring to FIGS. 23 and 24, first assist screen 411 and second assist screen 421 are identical in size to each other, and also identical in size to the display surface of display portion 207. When first assist screen 411 and second assist screen 421 each agree with the photographing range of camera 204, frame 413 indicating the first photographing range and frame 423 indicating the second photographing range are different in position within the photographing range of camera 204. More specifically, the position of center 413A of frame 413 indicating the first photographing range and the position of center 423A of frame 423 indicating the second photographing range differ from each other within the photographing range of camera 204. Furthermore, the ratio in size of frame 413 indicating the first photographing range to first assist screen 411 is different from the ratio in size of frame 423 indicating the second photographing range to second assist screen 421. Frame 413 indicating the first photographing range is larger than frame 423 indicating the second photographing range.

Returning to FIG. 21, conversion rule determining portion 297 determines a conversion rule for converting a reference position to a range within the source data, on the basis of the second base position input from second base setting portion 295, the first photographing range, and the second photographing range. Conversion rule determining portion 297 outputs the determined conversion rule to post-conversion extracting portion 299. For example, the conversion rule includes: a coefficient in the X-axis direction and a coefficient in the Y-axis direction which are determined by associating the relative positional relationship between the first and second photographing ranges with the values in the X-axis and Y-axis directions of the second base position, and a coefficient in the Z-axis direction which is determined by associating the difference between the sizes of the first and second photographing ranges with the value in the Z-axis direction of the second base position.

More specifically, a vector is drawn from the position of center 413A of first photographing range 413 to the position of center 423A of second photographing range 423, and a horizontal component of the vector in the horizontal direction of the entire photographing range of camera 204 is divided by the value in the X-axis direction of the second base position, to thereby obtain the coefficient in the X-axis direction. Further, a vertical component of that vector in the vertical direction of the entire photographing range of camera 204 is divided by the value in the Y-axis direction of the second base position, to thereby obtain the coefficient in the Y-axis direction. Then, when the value in the X-axis direction of the reference position is multiplied by the coefficient in the X-axis direction and the value in the Y-axis direction of the reference position is multiplied by the coefficient in the Y-axis direction, the obtained values can be used to determine the position of the center of the sheet within the photographing range of camera 204 at the time when the position of mobile information device 200A relative to the sheet corresponds to the reference position.

Further, the ratio between the length in the vertical or horizontal direction of the first photographing range and the length in the vertical or horizontal direction of the second photographing range is divided by the value in the Z-axis direction of the second base position, to obtain the coefficient in the Z-axis direction. Then, when the value in the Z-axis direction of the reference position is multiplied by the coefficient in the Z-axis direction, the obtained value can be used to determine the size of the sheet within the photographing range of camera 204 at the time when the position of mobile information device 200A relative to the sheet corresponds to the reference position.

From the position of the center of the image formed on the sheet within the photographing range of camera 204 and the size of the image within the photographing range of camera 204, a range in the image formed on the sheet (the image of the source data) that is included in the photographing range of camera 204 is determined.

Post-conversion extracting portion 299 receives source data from source data acquiring portion 243A, a reference position from reference position detecting portion 293, and a conversion rule from conversion rule determining portion 297. Post-conversion extracting portion 299 converts the reference position in accordance with the conversion rule, to thereby determine the range within the image of the source data that is included in the photographing range of camera 204. Post-conversion extracting portion 299 then determines a part of the source data corresponding to the determined range as the process target part. Post-conversion extracting portion 299 extracts the process target part from the source data, and outputs the extracted process target part to process executing portion 247.

Figure 25:
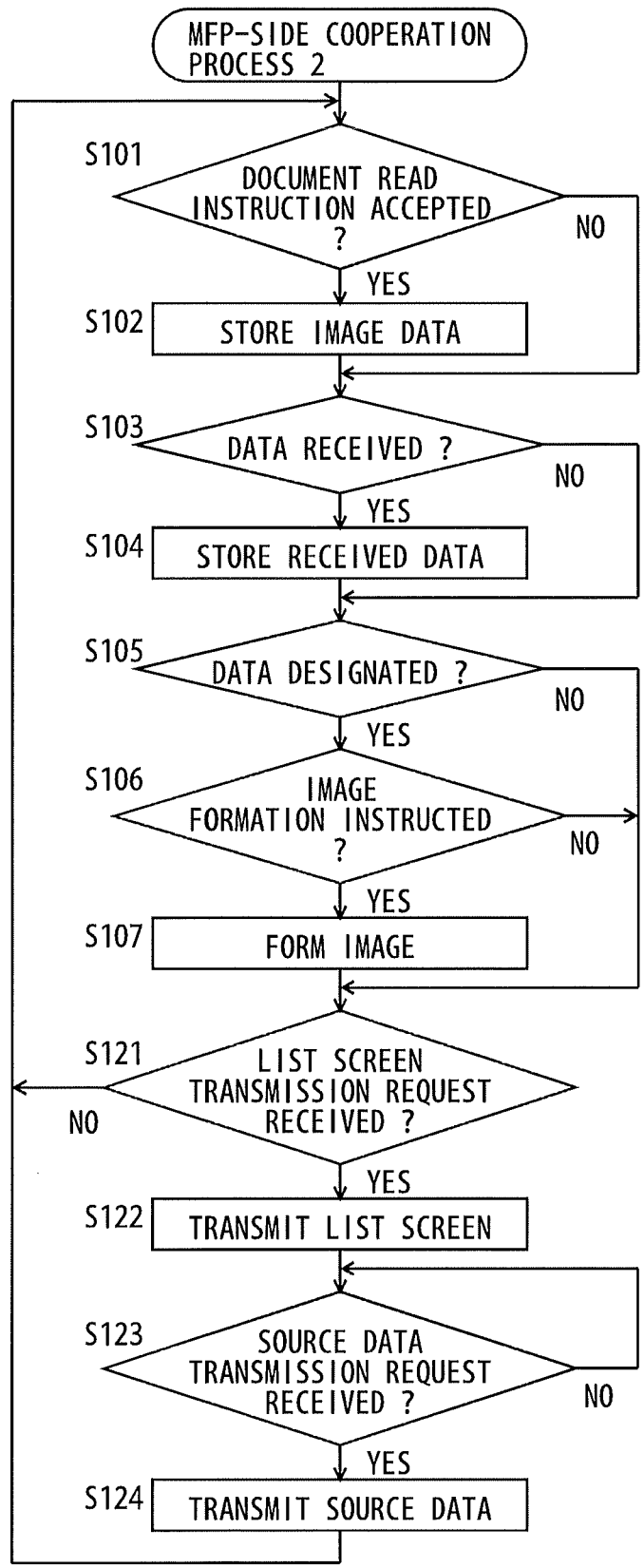
FIG. 25 is a flowchart illustrating an example of the flow of the MFP-side cooperation process according to the second embodiment.

FIG. 25 is a flowchart illustrating an example of the flow of the MFP-side cooperation process according to the second embodiment. The MFP-side cooperation process is carried out by CPU 111A included in MFP 100A as CPU 111A executes an MFP-side cooperation program stored in ROM 113, HDD 116, EEPROM 115, or CD-ROM 118A. Referring to FIG. 25, this process differs from the MFP-side cooperation process shown in FIG. 15 in that steps S121 through S124 are performed instead of steps S108 through S113. The other steps are the same as those in FIG. 15, and thus, the description thereof will not be repeated here.

In step S121, CPU 111A determines whether communication I/F portion 112 has received a list screen transmission request from mobile information device 200A. If so, the process proceeds to step S122; otherwise, the process returns to step S101. In step S122, CPU 111A generates a list screen by searching HDD 116, and transmits the generated list screen to mobile information device 200A via communication I/F portion 112.

In the following step S123, CPU 111A determines whether communication I/F portion 112 has received a source data transmission request from mobile information device 200A. CPU 111A is in a standby mode until a source data transmission request is received ("NO" in step S123), and once the source data transmission request is received, the process proceeds to step S124. In step S124, CPU 111A reads from HDD 116 data 91 that is specified by the data identification information included in the received source data transmission request, and transmits the read data 91 to mobile information device 200A via communication I/F portion 112. The process then returns to step S101.

Figure 26:
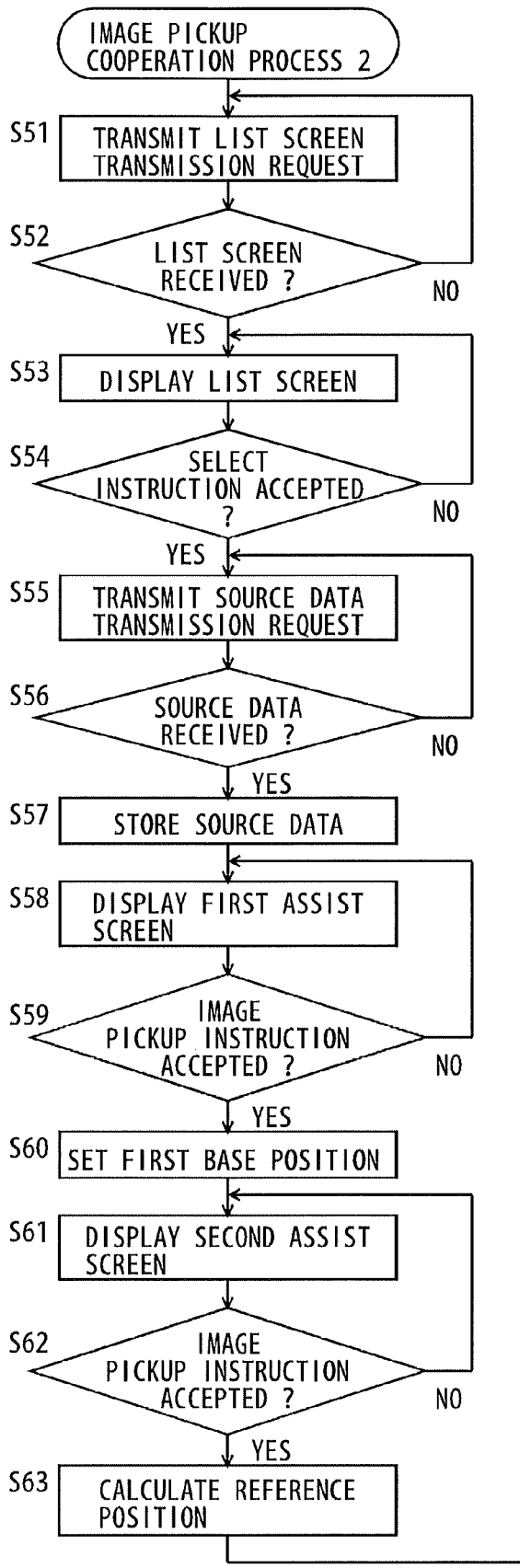
FIG. 26 is a flowchart illustrating an example of the flow of the image pickup cooperation process according to the second embodiment.
Figure 26:
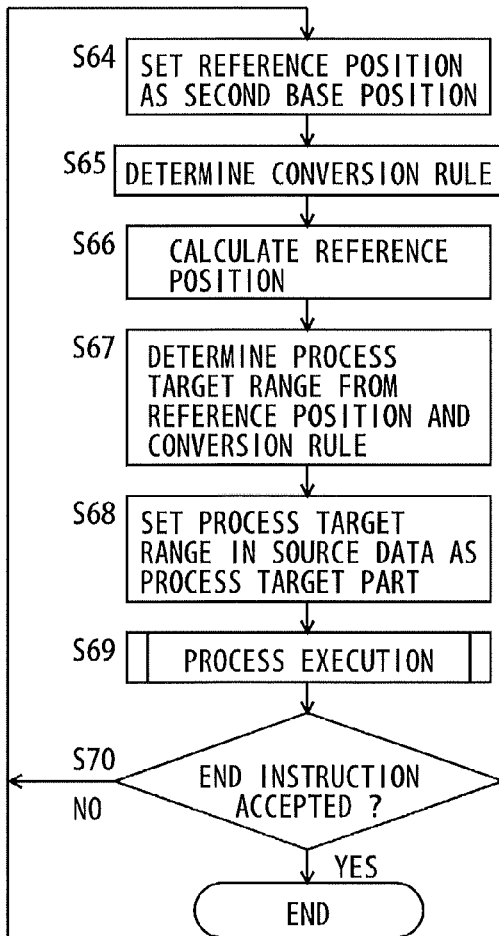

FIG. 26 is a flowchart illustrating an example of the flow of the image pickup cooperation process according to the second embodiment. The image pickup cooperation process according to the second embodiment is carried out by CPU 201A included in mobile information device 200A as CPU 201A executes an image pickup cooperation program stored in flash memory 203 or 210A.

Referring to FIG. 26, CPU 201A transmits a list screen transmission request to MFP 100A via wireless LAN I/F 209 (step S51). When MFP 100A receives the list screen transmission request, it returns a list screen which includes a list of the pieces of data identification information of data 91 stored in HDD 116. In step S52, CPU 201A determines whether wireless LAN I/F 209 has received the list screen from MFP 100A. If the list screen has been received, the process proceeds to step S53; otherwise, the process returns to step S51.

In step S53, CPU 201A displays the list screen received in step S52 on display portion 207. CPU 201A then determines whether a select instruction has been accepted (step S54). When the user inputs to operation portion 208 an operation of selecting one piece of data identification information included in the list screen, the select instruction is accepted. If the select instruction has been accepted, the process proceeds to step S55; otherwise, the process returns to step S53.

In step S55, CPU 201A transmits a source data transmission request including the data identification information selected in step S54, to MFP 100A via wireless LAN I/F 209. In the following step S56, CPU 201A determines whether wireless LAN I/F 209 has received source data from MFP 100A. If so, the process proceeds to step S57; otherwise, the process returns to step S55. In step S57, CPU 201A stores the received source data in flash memory 203, and the process proceeds to step S58.

In step S58, CPU 201A displays a first assist screen on display portion 207, and the process proceeds to step S59. In step S59, CPU 201A determines whether an image pickup instruction has been accepted. When the user operation of depressing the shutter button included in operation portion 208 is detected, the image pickup instruction is accepted. If the image pickup instruction has been accepted, the process proceeds to step S60; otherwise, the process returns to step S58. This is for securing the time for the user to perform the operation of determining the position of mobile information device 200A such that the image of the subject falls within the first photographing range defined in the first assist screen. In step S60, CPU 201A sets a first base position. Specifically, the position in three-dimensional space of mobile information device 200A is set as the first base position (or, origin).

In the following step S61, CPU 201A displays a second assist screen on display portion 207, and the process proceeds to step S62. In step S62, CPU 201A determines whether an image pickup instruction has been accepted. If so, the process proceeds to step S63; otherwise, the process returns to step S61. This is for securing the time for the user to perform the operation of determining the position of mobile information device 200A such that the image of the subject falls within the second photographing range defined in the second assist screen. In step S63, CPU 201A calculates a reference position. The reference position is calculated by integrating the accelerations in three directions that are output from three-axis acceleration sensor 212 after the image pickup instruction is accepted in step S59. In the following step S64, CPU 201A sets the calculated reference position as a second base position.

In the following step S65, CPU 201A determines a conversion rule. The conversion rule for converting the reference position to a range within the source data is determined on the basis of the second base position set in step S64, the first photographing range included in the first assist screen, and the second photographing range included in the second assist screen.

In the following step S66, CPU 201A calculates a reference position. The reference position is calculated by integrating the accelerations in three directions that are output from three-axis acceleration sensor 212 after the image pickup instruction is accepted in step S59. CPU 201A then determines a process target range within the image of the source data on the basis of the reference position calculated in step S66 and the conversion rule determined in step S65 (step S67). In the following step S68, CPU 201A sets a part of the source data stored in step S57 that corresponds to the process target range determined in step S67, as a process target part. In the following step S69, CPU 201A carries out the process executing process, and the process proceeds to step S70. The process executing process is the process shown in FIGS. 17 and 18. In the following step S70, CPU 201A determines whether an end instruction has been accepted. When the user operation of depressing the stop button prepared in operation portion 208 for instructing an end of the image pickup cooperation process is detected, the end instruction is accepted. If the end instruction has been accepted, the process is terminated; otherwise, the process returns to step S66. In step S66, the reference position at the time point when step S66 is carried out is calculated, and the processing in steps S67 and on is repeated.

As described above, according to image processing system 1 of the first embodiment, MFPs 100, 101, and 102 each store source data in HDD 116, and form an image of the source data on a sheet of paper. Mobile information device 200 causes camera 204 to pick up an image of the image formed on the sheet and acquires the picked-up image output from camera 204, and acquires source data corresponding to the picked-up image from one of MFPs 100, 101, and 102. Mobile information device 200 then determines, on the basis of the picked-up image, a process target part to be processed within the source data, and performs processing on the process target part of the source data. Accordingly, a user is able to specify the process target part of the source data while checking the image formed on the sheet by one of MFPs 100, 101, and 102. Further, for example in the case where MFP 100 has formed a reduced image of source data, the image of the source data formed on the sheet has a smaller amount of information than the source data. In such a case, the process target part in the source data having a greater amount of information than the picked-up image can be processed.

Further, mobile information device 200 compares the picked-up image with an image of the source data, and extracts, as the process target part, the part within the source data that corresponds to the area determined to be identical to or similar to the picked-up image within the image of the source data. As such, the process target part within the source data is determined by comparing the images, which ensures accurate determination of the process target part.

Further, mobile information device 200 displays an image of the process target part of the source data on display portion 207, allowing the user to confirm the process target part on the image. In the case where the source data has a greater amount of information than the picked-up image, the greater amount of information than in the picked-up image can be displayed.

Furthermore, display portion 207 is disposed on a side opposite from the side on which camera 204 is arranged, and the display surface of display portion 207 has its normal line corresponding to the optical axis of a lens of camera 204. This makes the image formed on the sheet and the display surface face the same direction, thereby allowing the user to specify the process target part while simultaneously seeing the image formed on the sheet and the image of the process target part.

Furthermore, related data related to the source data is displayed on display portion 207, enabling the information related to the image formed on the sheet to be displayed.

Further, a database is searched using character information included in the process target part of the source data as a keyword, and the search result is displayed, allowing the information related to the image formed on the sheet to be extracted from the database.

Furthermore, the process target part of the source data is transmitted via e-mail, which facilitates the operation of specifying the data to be transmitted.

Furthermore, the process target part of the source data is stored into HDD 116 in one of MFPs 100, 101, and 102, which facilitates the operation of specifying the data to be stored.

Furthermore, one of MFPs 100, 101, and 102 is caused to form an image of the process target part of the source data on a sheet of paper. This facilitates the operation of specifying the part the image of which is to be formed.

According to the image processing system 1A of the second embodiment, mobile information device 200A includes three-axis acceleration sensor 212, which detects accelerations in three directions crossing each other. Mobile information device 200A displays a first assist screen on display portion 207 to set a first base position at a first base time at which the image formed on the sheet falls within a first photographing range, detects a reference position on the basis of the accelerations in three directions detected on and after the first base time, displays a second assist screen on display portion 207 to set the reference position at a second base time at which the image formed on the sheet falls within a second photographing range as a second base position, determines a conversion rule for converting the reference position to a range within the source data on the basis of the relative positional relationship between the first and second photographing ranges and the relative positional relationship between the first and second base positions in three-dimensional space, and converts the reference position in accordance with the conversion rule, to thereby extract a process target part. In this manner, the process target part within the source data is determined by detecting the accelerations in three directions, which ensures accurate determination of the process target part. Further, it is unnecessary to compare two images, which can reduce the load on CPU 201A.

Further, the reference position including a first distance in the Z-axis direction (first direction) that is parallel to the optical axis of the lens of camera 204 and has its positive direction facing the lens, a second distance in the X-axis direction (second direction) that is perpendicular to the Z axis, and a third distance in the Y-axis direction (third direction) that is perpendicular to both of the Z axis and the X axis is detected, and the conversion rule is generated which determines the size of the range obtained by conversion to be inversely proportional to the first distance in the Z-axis direction (first direction). This makes it possible to change the size of the process target part by an operation of moving mobile information device 200A closer to or farther from the sheet of paper.

While image processing systems 1 and 1A have been described in the above embodiments, the present invention may of course be understood as a cooperation processing method for causing MFP 100, 100A and mobile information device 200, 200A to execute the processing shown in FIGS. 15-18, 25, and 26, or as a cooperation processing program for causing computers controlling MFP 100, 100A and mobile information device 200, 200A to execute that cooperation processing method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cooperation system including an image forming apparatus and a mobile information device capable of communicating with said image forming apparatus,
said image forming apparatus comprising:
a storage portion to store source data; and
an image forming portion to form an image of said stored source data on a sheet of paper;
said mobile information device comprising:
an image pickup portion;
an image pickup control portion to acquire a picked-up image that said image pickup portion outputs by picking up an image of the image formed on the sheet by said image forming apparatus;
a source data acquiring portion to acquire the source data corresponding to said picked-up image from said image forming apparatus;
a process target determining portion to determine, on the basis of said picked-up image, a process target part to be processed within said acquired source data; and
a process executing portion to execute processing on said determined process target part within said source data, wherein
said process target determining portion of said mobile information device includes a comparing portion to compare the picked-up image acquired by said image pickup control portion with an image of said source data.

2. The cooperation system according to claim 1, wherein said process target determining portion includes
a target part extracting portion to extract, as said process target part, a part of said source data that corresponds to an area within the image of said source data that has been determined to be identical to or similar to said picked-up image by said comparing portion.

3. A cooperation system including an image forming apparatus and a mobile information device capable of communicating with said image forming apparatus,
said image forming apparatus comprising:
a storage portion to store source data; and
an image forming portion to form an image of said stored source data on a sheet of paper;
said mobile information device comprising:
an image pickup portion;
an image pickup control portion to acquire a picked-up image that said image pickup portion outputs by picking up an image of the image formed on the sheet by said image forming apparatus;
a source data acquiring portion to acquire the source data corresponding to said picked-up image from said image forming apparatus;
a process target determining portion to determine, on the basis of said picked-up image, a process target part to be processed within said acquired source data;
a process executing portion to execute processing on said determined process target part within said source data; and
an acceleration detecting portion to detect accelerations in three directions crossing each other,
said source data acquiring portion includes a select instruction accepting portion to accept an instruction by a user to select said source data from the data stored in said storage portion, and
said process target determining portion includes
a first base setting portion to set a first base position at a first base time at which the image formed on the sheet fits within a first photographing range of said image pickup portion, the first base position being a position relative to said sheet of paper,
a reference position detecting portion to detect, on the basis of the accelerations in three directions output from said acceleration detecting portion at and after said first base time, a position at a reference time following said first base time as a reference position relative to said first base position,
a second base setting portion to set said reference position at a second base time, following said first base time, at which the image formed on the sheet fits within a second photographing range of said image pickup portion as a second base position, the second photographing range being different in size and position from said first photographing range,
a conversion rule determining portion to determine, on the basis of a relative positional relationship between said first and second photographing ranges within an entire photographing range of said image pickup portion and a relative positional relationship between said first and second base positions in three-dimensional space, a conversion rule for converting said reference position to a range within said source data, and a post-conversion extracting portion operative, in response to detection of said reference position by said reference position detecting portion, to extract a range within said source data that is obtained by converting said detected reference position in accordance with said determined conversion rule as the process target part.

4. The cooperation system according to claim 3, wherein said reference position detecting portion detects a reference position including a first distance in a first direction parallel to an optical axis of a lens included in said image pickup portion, the first direction having a positive direction corresponding to the direction in which said lens faces, a second distance in a second direction that is perpendicular to said first direction, and a third distance in a third direction that is perpendicular to said first and second directions, and said conversion rule determining portion includes a size determining portion to determine a size of said range obtained by conversion to be inversely proportional to the first distance in said first direction.

5. The cooperation system according to claim 1, wherein said mobile information device further comprises a display portion to display an image, and said process executing portion includes a display control portion to display an image of said determined process target part within said source data on said display portion.

6. The cooperation system according to claim 5, wherein said display portion is disposed on a side opposite from a side on which said image pickup portion is arranged, and said display portion has a display surface having a normal line corresponding to an optical axis of a lens included in said image pickup portion.

7. The cooperation system according to claim 5, wherein said storage portion further stores related data that is related to said source data, said process executing portion includes
a related data acquiring portion to acquire related data related to said source data, and
a related part extracting portion to extract, from said acquired related data, a related part that is related to said determined process target part within said source data, and
said display control portion displays an image of said extracted related part so as to be overlaid on the image of said determined process target part within said source data.

8. The cooperation system according to claim 5, wherein said process executing portion includes
a character information extracting portion to extract character information from said determined process target part within said source data, and
a searching portion to search a database on the basis of said extracted character information, and
said display control portion displays a result of the search of said database on said display portion.

9. The cooperation system according to claim 1, wherein said process executing portion includes a transmission control portion to transmit said determined process target part within said source data.

10. The cooperation system according to claim 1, wherein said process executing portion includes a storage control portion to store said determined process target part within said source data in a prescribed storage.

11. The cooperation system according to claim 1, wherein said process executing portion includes a print control portion to transmit said determined process target part within said source data to said image forming apparatus and cause said image forming apparatus to form an image of said process target part.

12. A mobile information device capable of communicating with an image forming apparatus, the image forming apparatus forming an image of source data on a sheet of paper and storing the source data, the mobile information device comprising:
an image pickup portion;
an image pickup control portion to acquire a picked-up image that said image pickup portion outputs by picking up an image of the image formed on the sheet by said image forming apparatus;
a source data acquiring portion to acquire the source data corresponding to said picked-up image from said image forming apparatus;
a process target determining portion to determine, on the basis of said picked-up image, a process target part to be processed within said acquired source data; and
a process executing portion to execute processing on said determined process target part within said source data, wherein
said process target determining portion includes a comparing portion to compare the picked-up image acquired by said image pickup control portion with an image of said source data.

13. The mobile information device according to claim 12, wherein said process target determining portion includes
a target part extracting portion to extract, as said process target part, a part of said source data that corresponds to an area within the image of said source data that has been determined to be identical to or similar to said picked-up image by said comparing portion.

14. A mobile information device capable of communicating with an image forming apparatus, the image forming apparatus forming an image of source data on a sheet of paper and storing the source data, the mobile information device comprising:
an image pickup portion;
an image pickup control portion to acquire a picked-up image that said image pickup portion outputs by picking up an image of the image formed on the sheet by said image forming apparatus;
a source data acquiring portion to acquire the source data corresponding to said picked-up image from said image forming apparatus;
a process target determining portion to determine, on the basis of said picked-up image, a process target part to be processed within said acquired source data;
a process executing portion to execute processing on said determined process target part within said source data; and
an acceleration detecting portion to detect accelerations in three directions crossing each other, wherein
said source data acquiring portion includes a select instruction accepting portion to accept an instruction by a user to select said source data from the data stored in said storage portion, and
said process target determining portion includes
a first base setting portion to set a first base position at a first base time at which the image formed on the sheet fits within a first photographing range of said image pickup portion, the first base position being a position relative to said sheet of paper, a reference position detecting portion to detect, on the basis of the accelerations in three directions output from said acceleration detecting portion at and after said first base time, a position at a reference time following said first base time as a reference position relative to said first base position, a second base setting portion to set said reference position at a second base time, following said first base time, at which the image formed on the sheet fits within a second photographing range of said image pickup portion as a second base position, the second photographing range being different in size and position from said first photographing range, a conversion rule determining portion to determine, on the basis of a relative positional relationship between said first and second photographing ranges within an entire photographing range of said image pickup portion and a relative positional relationship between said first and second base positions in three-dimensional space, a conversion rule for converting said reference position to a range within said source data, and a post-conversion extracting portion operative, in response to detection of said reference position by said reference position detecting portion, to extract a range within said source data that is obtained by converting said detected reference position in accordance with said determined conversion rule as the process target part.

15. The mobile information device according to claim 14, wherein said reference position detecting portion detects a reference position including a first distance in a first direction parallel to an optical axis of a lens included in said image pickup portion, the first direction having a positive direction corresponding to the direction in which said lens faces, a second distance in a second direction that is perpendicular to said first direction, and a third distance in a third direction that is perpendicular to said first and second directions, and said conversion rule determining portion includes a size determining portion to determine a size of said range obtained by conversion to be inversely proportional to the first distance in said first direction.

16. A cooperation processing method performed in a mobile information device capable of communicating with an image forming apparatus, the image forming apparatus forming an image of source data on a sheet of paper and storing the source data, the method comprising the steps of:

acquiring a picked-up image that an image pickup portion outputs by picking up an image of the image formed on the sheet by said image forming apparatus;

acquiring the source data corresponding to said picked-up image from said image forming apparatus;

determining, on the basis of said picked-up image, a process target part to be processed within said acquired source data by comparing the picked-up image acquired with an image of said source data acquired from said image forming apparatus, a target part extracting portion to extract, as said process target part, a part of said source data that corresponds to an area within the image of said source data that has been determined to be identical to or similar to said picked-up image by said comparing portion; and executing processing on said determined process target part within said source data.

17. A non-transitory computer-readable recording medium encoded with a cooperation processing program performed by a computer, the computer controlling a mobile information device capable of communicating with an image forming apparatus, the image forming apparatus forming an image of source data on a sheet of paper and storing the source data, the program causing said computer to perform the steps of:

acquiring a picked-up image that an image pickup portion outputs by picking up an image of the image formed on the sheet by said image forming apparatus;

acquiring the source data corresponding to said picked-up image from said image forming apparatus;

determining, on the basis of said picked-up image, a process target part to be processed within said acquired source data by comparing the picked-up image acquired from the image pickup portion with an image of said source data acquired from said image forming apparatus; and executing processing on said determined process target part within said source data.

18. The cooperation system according to claim 1, wherein the image pickup control portion comprises a processor configured to acquire the picked-up image that said image pickup portion outputs by picking up an image of the image formed on the sheet by said image forming apparatus.

19. The cooperation system according to claim 1, wherein the mobile information device comprises a processor configured to:

acquire the picked-up image that said image pickup portion outputs by picking up an image of the image formed on the sheet by said image forming apparatus;

acquire the source data corresponding to said picked-up image from said image forming apparatus;

determine, on the basis of said picked-up image, a process target part to be processed within said acquired source data; and execute processing on said determined process target part within said source data.

20. The mobile information device according to claim 12, further comprising a processor configured to:

acquire the picked-up image that said image pickup portion outputs by picking up an image of the image formed on the sheet by said image forming apparatus;

acquire the source data corresponding to said picked-up image from said image forming apparatus;

determine, on the basis of said picked-up image, a process target part to be processed within said acquired source data; and execute processing on said determined process target part within said source data.

21. The cooperation system according to claim 1, wherein said process target determining portion is configured to determine, as said process target part, a part of said source data that corresponds to said picked-up image.

22. The mobile information device according to claim 12, wherein said process target determining portion is configured to determine, as said process target part, a part of said source data that corresponds to said picked-up image.

23. The cooperation processing method according to claim 16, wherein said process target part is a part of said acquired source data that corresponds to said picked-up image.

24. The non-transitory computer readable recording medium according to claim 17, wherein said process target part is a part of said acquired source data that corresponds to said picked-up image.

* * * * *